US011822843B2

(12) United States Patent
Shibata

(10) Patent No.: US 11,822,843 B2
(45) Date of Patent: Nov. 21, 2023

(54) IMAGE FORMING APPARATUS, INFORMATION PROCESSING SYSTEM, METHOD OF CONTROLLING IMAGE FORMING APPARATUS, AND STORAGE MEDIUM

(71) Applicant: CANON KABUSHIKI KAISHA, Tokyo (JP)

(72) Inventor: Daisuke Shibata, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/887,781

(22) Filed: Aug. 15, 2022

(65) Prior Publication Data

US 2023/0061231 A1 Mar. 2, 2023

(30) Foreign Application Priority Data

Aug. 27, 2021 (JP) ................................ 2021-138951

(51) Int. Cl.
*G06F 3/12* (2006.01)

(52) U.S. Cl.
CPC .......... *G06F 3/1273* (2013.01); *G06F 3/1207* (2013.01); *G06F 3/1255* (2013.01); *G06F 3/1288* (2013.01)

(58) Field of Classification Search
CPC .... G06F 3/1258; G06F 3/1205; G06F 3/1273; G06F 3/1207; G06F 3/1255; G06F 3/1288
See application file for complete search history.

(56) References Cited

U.S. PATENT DOCUMENTS

| | | | | |
|---|---|---|---|---|
| 9,349,078 | B2 | 5/2016 | Kujirai | |
| 2015/0281475 | A1* | 10/2015 | Nagasaki | G06F 3/1287 358/1.13 |
| 2018/0334349 | A1* | 11/2018 | Miyahara | B65H 43/06 |
| 2020/0259964 | A1* | 8/2020 | Mizuta | G06N 3/084 |
| 2020/0285177 | A1* | 9/2020 | Yamada | G03G 15/2053 |

FOREIGN PATENT DOCUMENTS

| | | | |
|---|---|---|---|
| JP | 2015148847 | A | 8/2015 |

* cited by examiner

*Primary Examiner* — Iriana Cruz
(74) *Attorney, Agent, or Firm* — ROSSI, KIMMS & McDOWELL LLP

(57) ABSTRACT

An image forming apparatus that includes an image forming section configured to form an image on a sheet and is capable of communicating with a server. The image forming section executes a series of an image formation job including a first step for forming an image on a sheet having a first attribute and a second step for forming an image on a sheet having a second attribute different from the first attribute after the first step. History information of the image formation job, which enables identification of switching timing between the first step and the second step, is acquired and notified to the server.

12 Claims, 30 Drawing Sheets

| | | | 622 |
|---|---|---|---|

SHEET BRAND SETTINGS

| ■ NAME | ▶ PLAIN PAPER 2 | 623 | CHANGE ▶ |
| ■ TYPE | ▶ USER-DEFINED SHEET | 624 | CHANGE ▶ |
| ■ BASIS WEIGHT | ▶ 80g / m² | 625 | CHANGE ▶ |
| ■ SURFACE PROPERTY | ▶ FINE QUALITY PAPER | 626 | CHANGE ▶ |
| ■ COLOR | ▶ WHITE | 627 | CHANGE ▶ |
| ■ FEATURE | ▶ NONE | 628 | CHANGE ▶ |
| | | 629 | OK ↵ |

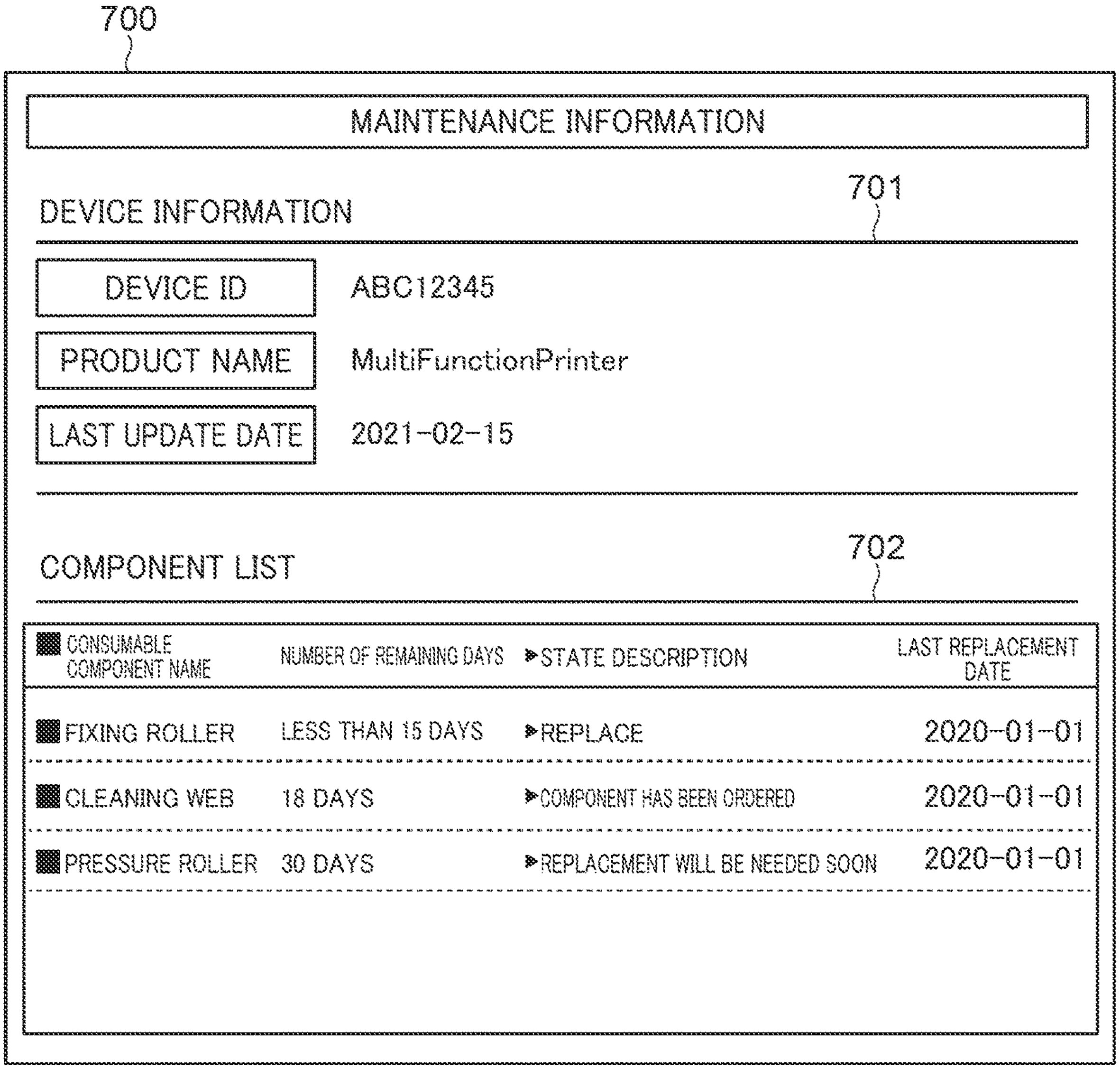

*FIG. 7*

MAINTENANCE INFORMATION

DEVICE INFORMATION

| DEVICE ID | ABC12345 |
| PRODUCT NAME | MultiFunctionPrinter |
| LAST UPDATE DATE | 2021-02-15 |

COMPONENT LIST

| CONSUMABLE COMPONENT NAME | NUMBER OF REMAINING DAYS | ▶STATE DESCRIPTION | LAST REPLACEMENT DATE |
|---|---|---|---|
| ▉ FIXING ROLLER | LESS THAN 15 DAYS | ▶REPLACE | 2020-01-01 |
| ▉ CLEANING WEB | 18 DAYS | ▶COMPONENT HAS BEEN ORDERED | 2020-01-01 |
| ▉ PRESSURE ROLLER | 30 DAYS | ▶REPLACEMENT WILL BE NEEDED SOON | 2020-01-01 |

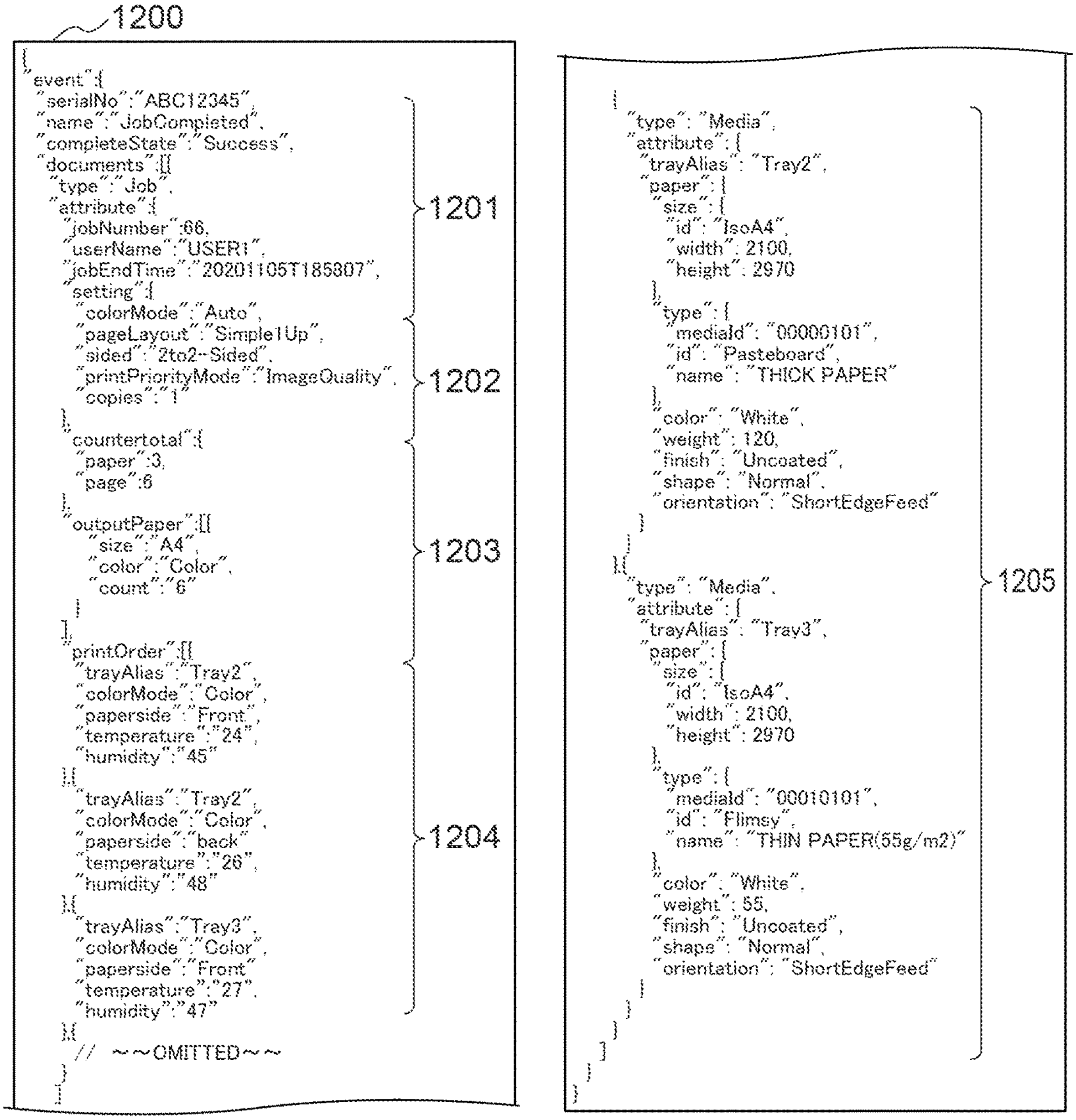

*FIG. 12A*

```
{                                                           ⎫
  "event":{                                                 ⎪
    "serialNo":"ABC12345",                                  ⎪
    "name":"JobCompleted",                                  ⎬ 1201
    "completeState":"Success",                              ⎪
    "documents":[{                                          ⎪
      "type":"Job",                                         ⎭
      "attribute":{                                         ⎫
        "jobNumber":66,                                     ⎪
        "userName":"USER1",                                 ⎪
        "jobEndTime":"20201105T185807",                     ⎪
        "setting":{                                         ⎬ 1202
          "colorMode":"Auto",                               ⎪
          "pageLayout":"Simple1Up",                         ⎪
          "sided":"2to2-Sided",                             ⎪
          "printPriorityMode":"ImageQuality",               ⎪
          "copies":"1"                                      ⎭
        },
        "countertotal":{                                    ⎫
          "paper":3,                                        ⎪
          "page":6                                          ⎪
        },                                                  ⎬ 1203
        "outputPaper":[{                                    ⎪
          "size":"A4",                                      ⎪
          "color":"Color",                                  ⎪
          "count":"6"                                       ⎭
        }
      ],
      "printOrder":[{                                       ⎫
        "trayAlias":"Tray2",                                ⎪
        "colorMode":"Color",                                ⎪
        "paperside":"Front",                                ⎪
        "temperature":"24",                                 ⎪
        "humidity":"45"                                     ⎪
      },{                                                   ⎪
        "trayAlias":"Tray2",                                ⎪
        "colorMode":"Color",                                ⎪
        "paperside":"back",                                 ⎬ 1204
        "temperature":"26",                                 ⎪
        "humidity":"48"                                     ⎪
      },{                                                   ⎪
        "trayAlias":"Tray3",                                ⎪
        "colorMode":"Color",                                ⎪
        "paperside":"Front",                                ⎪
        "temperature":"27",                                 ⎪
        "humidity":"47"                                     ⎪
      },{                                                   ⎭
        // ~~OMITTED~~
      }
    }
```

```
                                                            ⎫
    "type":"Media",                                         ⎪
    "attribute":{                                           ⎪
      "trayAlias":"Tray2",                                  ⎪
      "paper":[                                             ⎪
        "size":{                                            ⎪
          "id":"IsoA4",                                     ⎪
          "width":2100,                                     ⎪
          "height":2970                                     ⎪
        },                                                  ⎪
        "type":{                                            ⎪
          "mediaId":"00000101",                             ⎪
          "id":"Pasteboard",                                ⎪
          "name":"THICK PAPER"                              ⎪
        },                                                  ⎪
        "color":"White",                                    ⎪
        "weight":120,                                       ⎪
        "finish":"Uncoated",                                ⎪
        "shape":"Normal",                                   ⎪
        "orientation":"ShortEdgeFeed"                       ⎪
      ]                                                     ⎪
    },                                                      ⎬ 1205
    "type":"Media",                                         ⎪
    "attribute":{                                           ⎪
      "trayAlias":"Tray3",                                  ⎪
      "paper":[                                             ⎪
        "size":{                                            ⎪
          "id":"IsoA4",                                     ⎪
          "width":2100,                                     ⎪
          "height":2970                                     ⎪
        },                                                  ⎪
        "type":{                                            ⎪
          "mediaId":"00010101",                             ⎪
          "id":"Flimsy",                                    ⎪
          "name":"THIN PAPER(55g/m2)"                       ⎪
        },                                                  ⎪
        "color":"White",                                    ⎪
        "weight":55,                                        ⎪
        "finish":"Uncoated",                                ⎪
        "shape":"Normal",                                   ⎪
        "orientation":"ShortEdgeFeed"                       ⎪
      ]                                                     ⎪
    }                                                       ⎭
  ]
}
```

1200

```
{
 "event": {
   "serialNo": "ABC12345",
   "name": "PartsReplaced",
   "documents": [{
       "type": "Parts",
       "attribute": {
         "partsInformation":{
           "partsName": "Roller",
           "counterOnReplacement": "56789"
         },
         "dateAndTimeReplaced": "20210215T095000",
         "lastReplacement": {
           "date": "20200630T123400",
           "partsCounter": "18000"
         }
       }
   }]
 }
}
```

1206 — outer brace
1207 — event block
1208 — attribute block

FIG. 16

SHEET FEED CASSETTE INFORMATION TABLE

| SHEET FEED CASSETTE | SHEET SIZE | SHEET NAME | SHEET BRAND ID |
|---|---|---|---|
| SHEET FEED CASSETTE 1 | A4 | PLAIN PAPER 1 | 00000100 |
| SHEET FEED CASSETTE 2 | A4 | THICK PAPER | 00000101 |
| SHEET FEED CASSETTE 3 | A4 | THIN PAPER (55g/m$^2$) | 00010104 |
| SHEET FEED CASSETTE 4 | - | - | - |
| MANUAL FEEDING TRAY | - | - | - |

FIG. 17

SHEET BRAND TABLE

| SHEET BRAND ID | SHEET NAME | TYPE | BASIS WEIGHT ($g/m^2$) | SURFACE PROPERTY | COLOR | FEATURE |
|---|---|---|---|---|---|---|
| 00000100 | PLAIN PAPER 1 | BASIC SETTINGS | $70g/m^2$ | FINE QUALITY PAPER | WHITE | NONE |
| 00000101 | THICK PAPER | BASIC SETTINGS | $120g/m^2$ | FINE QUALITY PAPER | WHITE | NONE |
| 00000103 | COLOR PAPER | BASIC SETTINGS | $75g/m^2$ | FINE QUALITY PAPER | BLUE | NONE |
| 00000104 | THIN PAPER | BASIC SETTINGS | $63g/m^2$ | FINE QUALITY PAPER | WHITE | NONE |
| 00010101 | PLAIN PAPER 2 | USER SETTINGS | $80g/m^2$ | FINE QUALITY PAPER | WHITE | NONE |
| 00010102 | RECYCLED PAPER (PUNCHED) | USER SETTINGS | $70g/m^2$ | RECYCLED PAPER | WHITE | PUNCHED |
| 00010104 | THIN PAPER ($55g/m^2$) | USER SETTINGS | $55g/m^2$ | FINE QUALITY PAPER | WHITE | NONE |

FIG. 18

JOB HISTORY INFORMATION TABLE

| | |
|---|---|
| BASIC INFORMATION | JOB IDENTIFICATION NUMBER |
| | USER NAME |
| | PRINT-START DATE AND TIME |
| | PRINT-END DATE AND TIME |
| PRINT SETTING INFORMATION | COLOR MODE |
| | PAGE LAYOUT |
| | MIXED SHEET-TIME PRINT MODE |
| | NUMBER OF COPIES |
| OUTPUT INFORMATION | TOTAL NUMBER OF OUTPUT PAGES, NUMBER OF SHEETS |
| | NUMBERS OF COLOR-PRINTED SIDES & SHEETS OF EACH SHEET BRAND ID |
| | NUMBERS OF MONOCHROME-PRINTED SIDES & SHEETS OF EACH SHEET BRAND ID |
| PRINT ORDER INFORMATION | SHEET FEED CASSETTE |
| | COLOR MODE |
| | PRINTED SIDE |
| | TEMPERATURE |
| | HUMIDITY |

*FIG. 19*

| SHEET TYPE | RANGE OF BASIS WEIGHT | FIXING TEMPERATURE | |
|---|---|---|---|
| | | IMAGE QUALITY PRIORITY MODE | PRODUCTIVITY PRIORITY MODE |
| THIN PAPER | 55～69 | 180℃ | 200℃ |
| PLAIN PAPER | 70～105 | 180℃ | 200℃ |
| THICK PAPER | 106～180 | 215℃ | 200℃ |
| SUPER-THICK PAPER | 180～300 | 220℃ | 200℃ |

*FIG. 20*

SHEET FEED CASSETTE INFORMATION TABLE

| SHEET FEED CASSETTE | SHEET SIZE | SHEET NAME | SHEET BRAND ID |
|---|---|---|---|
| SHEET FEED CASSETTE 1 | A4 | PLAIN PAPER 1 | 00000100 |
| SHEET FEED CASSETTE 2 | A4 | THICK PAPER | 00000101 |
| SHEET FEED CASSETTE 3 | A4 | THIN PAPER ($55g/m^2$) | 00010104 |
| MANUAL FEEDING TRAY | A3 | PLAIN PAPER 1 | 00000100 |
| SHEET FEED CASSETTE 3-2 | A4 | THIN PAPER | 00000105 |

IMAGE FORMING APPARATUS, INFORMATION PROCESSING SYSTEM, METHOD OF CONTROLLING IMAGE FORMING APPARATUS, AND STORAGE MEDIUM

BACKGROUND OF THE INVENTION

Field of the Invention

The present invention relates to an image forming apparatus, an information processing system, a method of controlling the image forming apparatus, and a storage medium.

Description of the Related Art

In recent years, in a field related to image formation (printing), a variety of types of sheets have come into widespread use in accordance with needs of customers. Further, image forming apparatuses, such as a printer, include an apparatus configured to be capable of registering sheet types and appropriately changing a variety of parameters for image formation for each sheet type so as to cope with a variety of types of sheets (see e.g. Japanese Laid-Open Patent Publication (Kokai) No. 2015-148847). Japanese Laid-Open Patent Publication (Kokai) No. 2015-148847 discloses a system that collects sheet brand information and job history from an image forming apparatus and manages a job execution result for each sheet type.

Incidentally, in the image forming apparatus, a mixed sheet job that switches sheets different in type in the middle of the job is sometimes executed depending on its use environment. In the invention described in Japanese Laid-Open Patent Publication (Kokai) No. 2015-148847, it is possible to identify association of a plurality of sheet types with one job, but it is impossible to grasp the order and the timing in which the sheet type are switched. Presumably, this switching of the sheet type influences the print quality achieved by the image forming apparatus, the service life of components of the image forming apparatus, and so forth. Therefore, it is desirable to properly collect information associated with the switching between the sheet types.

SUMMARY OF THE INVENTION

The present invention provides an image forming apparatus that is capable of processing information associated with switching between sheets different in attribute during image formation, an information processing system, a method of controlling the image forming apparatus, and a storage medium.

In a first aspect of the present invention, there is provided an image forming apparatus that includes an image forming section configured to form an image on a sheet and is capable of communicating with a server, including at least one processor, and a memory coupled to the at least one processor, the memory having instructions that, when executed by the processor, perform the operations as: an execution unit configured to cause the image forming section to execute a series of an image formation job including a first step for forming an image on a sheet having a first attribute and a second step for forming an image on a sheet having a second attribute different from the first attribute after the first step, an acquisition unit configured to acquire history information of the image formation job, which enables identification of switching timing between the first step and the second step, and a notification unit configured to notify the server of the history information.

In a second aspect of the present invention, there is provided an information processing system that includes an image forming apparatus including an image forming section configured to form an image on a sheet, and a server that is capable of communicating with the image forming apparatus and collecting log information of the image forming apparatus, the image forming apparatus including at least one processor, and a memory coupled to the at least one processor, the memory having instructions that, when executed by the processor, perform the operations as: an execution unit configured to cause the image forming section to execute a series of an image formation job including a first step for forming an image on a sheet having a first attribute and a second step for forming an image on a sheet having a second attribute different from the first attribute after the first step, an acquisition unit configured to acquire history information of the image formation job, which enables identification of switching timing between the first step and the second step, and a notification unit configured to notify the server of the history information, and the server including at least one processor, and a memory coupled to the at least one processor, the memory having instructions that, when executed by the processor, perform the operations as: a server acquisition unit configured to acquire the history information notified from the notification unit, and an identification unit configured to identify the switching timing based on the history information acquired by the server acquisition unit.

In a third aspect of the present invention, there is provided a method of controlling an image forming apparatus that includes an image forming section configured to form an image on a sheet and is capable of communicating with a server, including causing the image forming section to execute a series of an image formation job including a first step for forming an image on a sheet having a first attribute and a second step for forming an image on a sheet having a second attribute different from the first attribute after the first step, acquiring history information of the image formation job, which enables identification of switching timing between the first step and the second step, and notifying the server of the history information.

According to the present invention, it is possible to process the information associated with switching between sheets different in attribute.

Further features of the present invention will become apparent from the following description of exemplary embodiments (with reference to the attached drawings).

BRIEF DESCRIPTION OF THE DRAWINGS

FIG. 7 is a diagram showing an example of a screen displayed on an operation section of the analysis server.

FIGS. 12A and 12B are diagrams each showing an example of a log transmitted from the image forming apparatus to the analysis server.

FIG. 16 is a diagram showing an example of a sheet feed cassette information table managed by a sheet feed cassette management section.

FIG. 17 is a diagram showing an example of a sheet brand table managed by a sheet brand information management section.

FIG. 18 is a diagram showing an example of job history information managed by a job history management section.

FIG. 19 is a diagram showing a relationship between a basis weight of each sheet and a fixing temperature set according to a print mode switching setting for mixed sheet printing.

FIG. 20 is a diagram showing another example of the sheet feed cassette information table managed by the sheet feed cassette management section.

DESCRIPTION OF THE EMBODIMENTS

The present invention will now be described in detail below with reference to the accompanying drawings showing embodiments thereof.

The embodiments of the present invention will now be described in detail below with reference to the accompanying drawings. However, the components described in these embodiments are described only by way of example and are by no means intended to limit the scope of the present invention to them alone.

A description will be given of a first embodiment of the present invention with reference to FIGS. 1 to 12B.

Figure 1:
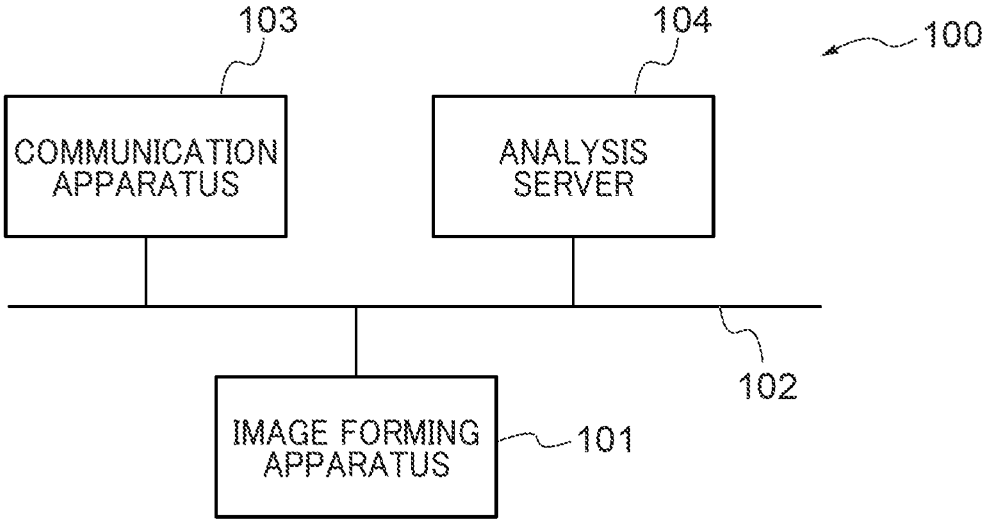
FIG. 1 is a schematic block diagram of an information processing system.

FIG. 1 is a schematic block diagram of an information processing system (network configuration). As shown in FIG. 1, the information processing system, denoted by reference numeral 100, includes an image forming apparatus 101, a communication apparatus 103, and an analysis server (server) 104, which are communicably interconnected via a network 102.

The image forming apparatus 101 performs printing on a sheet, i.e. forms an image on a sheet material (sheet) S based on print data received via the network 102. For this printing, a known printing method, such as an electrophotographic method and an inkjet method, is used. Further, the image forming apparatus 101 is capable of reading an original and generating image data of the read original using a scanner 409, referred to hereinafter. Further, the image forming apparatus 101 is also capable of printing this image data and transmitting the image data e.g. by Email. Further, the image forming apparatus 101 is also capable of transmitting job history information in which results of execution of jobs are recorded to the analysis server 104. Note that although the image forming apparatus 101 has a printer function and a scanner function in the present embodiment, this is not limitative, but for example, the scanner function may be omitted.

The communication apparatus 103 is e.g. a personal computer (PC). The communication apparatus 103 generates print data according to an instruction received from a user using the information processing system 100 (hereinafter simply referred to as "the user") and transmits the generated print data to the image forming apparatus 101.

The analysis server 104 acquires job history information, replacement information of components, and so forth from the image forming apparatus 101. Further, the analysis server 104 performs aggregation of usage conditions of the image forming apparatus 101 and prediction of a lifetime of each of consumable ones of components (members) forming the image forming apparatus 101 based on these acquired information items. Further, the analysis server 104 orders the consumable components based on the lifetime prediction and provides maintenance information.

Figure 2:
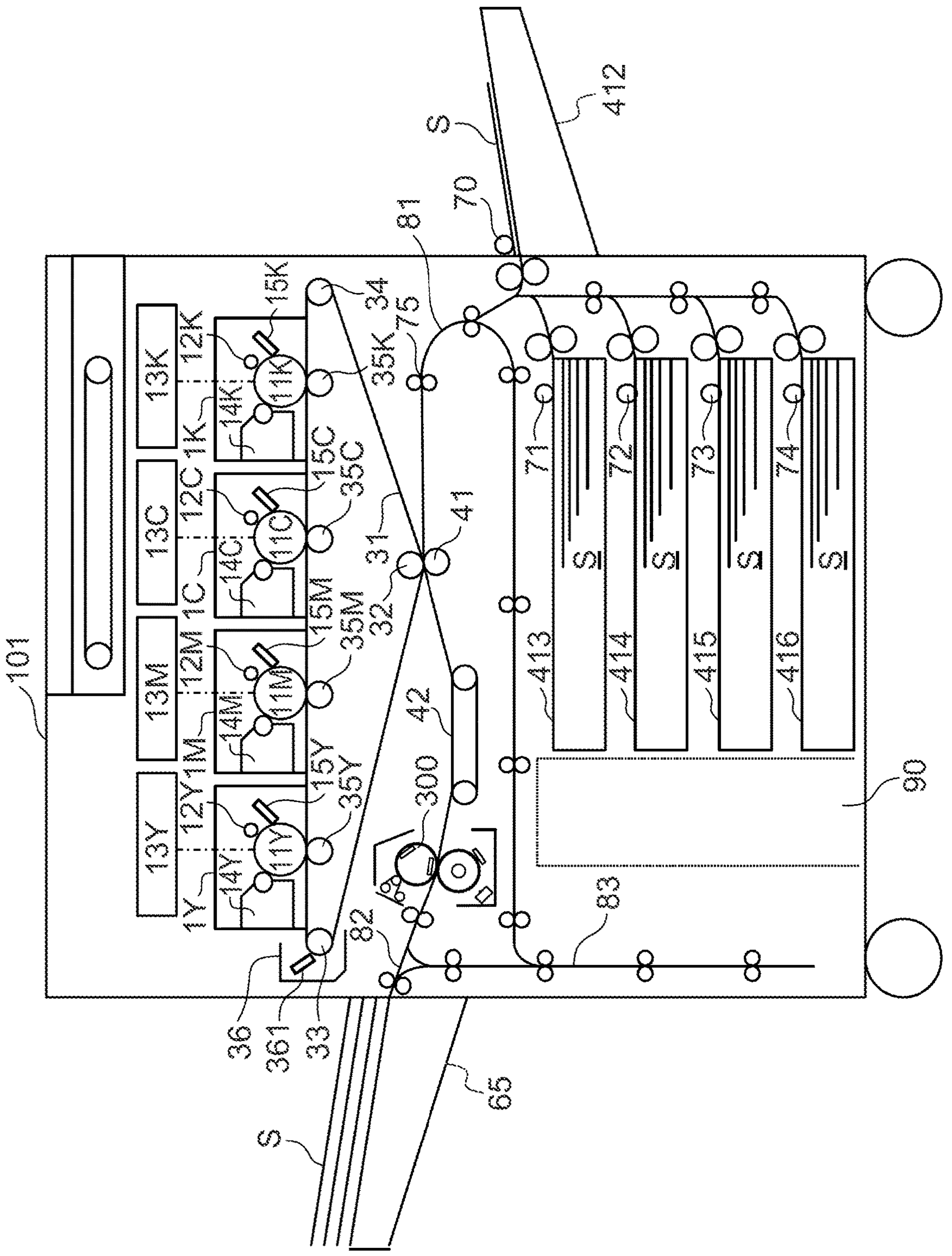
FIG. 2 is a schematic view of the inside of an image forming apparatus.

FIG. 2 is a schematic view of the inside of the image forming apparatus 101, as viewed from the front. This image forming apparatus 101 is capable of forming a full-color image on a sheet material S (sheet) using the electrophotographic method according to image signals, i.e. print data transmitted from an external apparatus, such as the communication apparatus 103. As shown in FIG. 2, the image forming apparatus 101 is an image forming apparatus of a tandem intermediate transfer system, including an intermediate transfer belt 31, and an image forming unit 1Y, an image forming unit 1M, an image forming unit 1C, and an image forming unit 1K, which are arranged in series on horizontal part of the intermediate transfer belt 31. The image forming unit 1Y forms a toner image of yellow (Y) on a photosensitive drum 11Y. The image forming unit 1M forms a toner image of magenta (M) on a photosensitive drum 11M. The image forming unit 1C forms a toner image of cyan (C) on a photosensitive drum 11C. The image forming unit 1K forms a toner image of black (K) on a photosensitive drum 11K. Thus formed toner images can be primarily transferred onto the same image position on the intermediate transfer belt 31. The intermediate transfer belt 31 is stretched and rotated by a drive roller 33, a tension roller 34, and a transfer counter roller 32 for performing secondary transfer. Further, on an inner circumferential surface-side of the intermediate transfer belt 31, there are arranged a primary transfer roller 35Y, a primary transfer roller 35M, a primary transfer roller 35C, and a primary transfer roller 35K for performing primary transfer. The primary transfer roller 35Y is arranged at a location opposed to the photosensitive drum 11Y. The primary transfer roller 35M is arranged at a location opposed to the photosensitive drum 11M. The primary transfer roller 35C is arranged at a location opposed to the photosensitive drum 11C. The primary transfer roller 35K is arranged at a location opposed to the photosensitive drum 11K. On an outer circumferential side of the photosensitive drum 11Y, there are sequentially arranged a charger 12Y, an exposure device 13Y, a developing device 14Y, and a cleaning device 15Y along the circumferential direction. The charger 12Y uniformly charges the surface of the photosensitive drum 11Y. The exposure device 13Y irradiates an image light onto the photosensitive drum 11Y to form a latent image on the surface thereof. The developing device 14Y transfers toner onto the latent image on the photosensitive drum 11Y to form a toner image. The cleaning device 15Y removes toner remaining on the photosensitive drum 11Y after primary transfer of the toner image. Similarly, on an outer circumferential side of the photosensitive drum 11M, there are sequentially arranged a charger 12M, an exposure device 13M, a developing device 14M, and a cleaning device 15M along the circumferential direction. On an outer circumferential side of the photosensitive drum 11C, there are sequentially arranged a charger 12C, an exposure device 13C, a developing device 14C, and a cleaning device 15C along the circumferential direction. On an outer circumferential side of the photosensitive drum 11K, there are sequentially arranged a charger 12K, an exposure device 13K, a developing device 14K, and a cleaning device 15K along the circumferential direction.

Further, the image forming apparatus 101 includes a manual feeding tray 412, a sheet feeding tray 413, a sheet feeding tray 414, a sheet feeding tray 415, and a sheet feeding tray 416. The sheet feeding trays 413 to 416 each can store the sheet material S. When one of a sheet feed roller 70, a sheet feed roller 71, a sheet feed roller 72, a sheet feed roller 73, and a sheet feed roller 74 is rotated, a sheet material S facing the rotating sheet feed roller is conveyed into a sheet feed conveying path 81. A registration roller 75 is arranged on the sheet feed conveying path 81. The registration roller 75 delivers the sheet material S to a secondary transfer section formed by contact between a secondary transfer roller 41 and the transfer counter roller 32 in synchronism with the toner image on the intermediate transfer belt 31.

Further, the sheet material S on which the toner image has been transferred is conveyed to a heat-fixing unit 300 by a conveying belt 42. The sheet material S is heated and press-fixed by the heat-fixing unit 300, whereby the toner image is fixed to the surface of the sheet material S, that is, a full-color image is fixed. After that, the sheet material S passes through a discharge conveying path 82 and an inversion conveying path 83 and is conveyed out to a discharge tray 65. Here, transfer residual toner generated during image formation and deteriorated developer generated in the developing section (hereinafter collectively referred to as the "waste toner") will be described. The waste toner generated on the photosensitive drum 11Y is scraped by a blade of the cleaning device 15Y and conveyed to the inner side of the apparatus by a screw (not shown). The same is applied to waste toner generated on the photosensitive drums 11M, 11C, and 11K. Further, the waste toner scraped by a blade 361 of a transfer cleaning unit 36 is also conveyed to the inner side of the apparatus and conveyed to a waste toner container 90.

Figure 3:
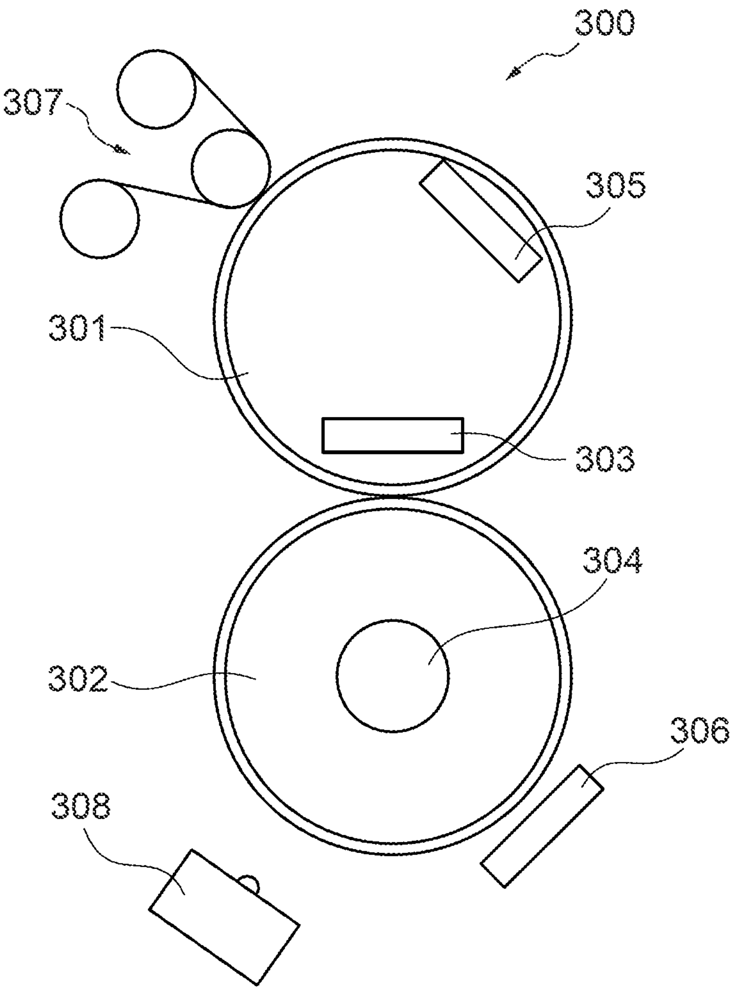
FIG. 3 is a schematic view of a heat fixing unit (image heating device) included in the image forming apparatus.

FIG. 3 is a schematic view of the heat fixing unit included in the image forming apparatus 101. The heat-fixing unit 300 heats and melts an unfixed toner image (unheated toner image) on the sheet material S conveyed thereto to thereby fix the toner image. As shown in FIG. 3, the heat-fixing unit 300 includes a fixing roller 301, a pressure roller 302, a heater 303, a core metal 304, a temperature sensor 305, a temperature sensor 306, a cleaning web 307, and a cooling device 308. The heater 303 is arranged inside the fixing roller 301. With this, it is possible to apply heat to the sheet material S (sheet) passing between the fixing roller 301 and the pressure roller 302. The pressure roller 302 rotates with the core metal 304 in its center and can apply pressure to the sheet material S by conveying the sheet material S such that the sheet material S is sandwiched between the pressure roller 302 and the fixing roller 301. The temperature sensor 305 is a sensor for measuring a surface temperature of the fixing roller 301, and the temperature sensor 306 is a sensor for measuring a surface temperature of the pressure roller 302. Then, information on these temperatures is notified to a controller unit 400, referred to hereinafter. The cleaning web 307 is a device for removing toner remaining on the fixing roller 301. The cooling device 308 is a device for cooling the pressure roller 302. Note that the type of the cooling device 307 is not particularly limited, but for example, an air-cooling type having a fan can be employed.

In the image forming apparatus 101, some of a plurality of components forming the image forming apparatus 101 are consumable components, which are individually replaceable. For example, in the heat-fixing unit 300, the fixing roller 301, the pressure roller 302, the cleaning web 307, and the fan in the cooling device 308 are consumable components. In the image forming apparatus 101, not only these components, but also the sheet feed roller 70, the sheet feed roller 71, the sheet feed roller 72, the sheet feed roller 73, and the sheet feed roller 74 are consumable components. The sheet feed rollers 70 to 74 are progressively degraded by repeating conveyance of the sheet material S, and eventually degraded to a degree at which it is difficult to realize desired conveyance. In this case, replacement of the thus degraded ones of the sheet feed rollers 70 to 74 is required. The image forming unit 1Y, the image forming unit 1M, the image forming unit 1C, and the image forming unit 1K are also consumable components. Toner in toner cartridges in the image forming units 1Y to 1K is consumed in accordance with printing. Then, when toner in any of the toner cartridges runs out, a toner cartridge in which toner has run out is required to be replaced by a new one. The waste toner container 90 is also a consumable component. The waste toner container 90 stores toner collected during printing, and hence when the waste toner container 90 is filled with toner, the waste toner container 90 is required to be replaced. In the present embodiment, a state in which such a consumable component as mentioned above is used until replacement is required is determined as expiration of its lifetime. For example, in the controller unit 400, the number of times of actual use of a consumable component (actual use times) and the number of times of use up to expiration of the lifetime of the consumable component (lifetime expiration use times), set in advance, are compared, whereby it is possible to determine whether or not the lifetime of the consumable component has expired. Further, there is a case where depending on a consumable component, the condition before actual expiration of the lifetime of the consumable component changes according not only to the number of times of use, but also to a variety of conditions, such as a type of a job (image formation job) in which the consumable component is used, a type and characteristics of printed sheets, and fixing control in image formation. In the present embodiment, log information (the number of times of use of consumable components and history information of print jobs) associated with use of the image forming apparatus 101 is transmitted to the analysis server 104. The analysis server 104 can collect the log information received from the image forming apparatus 101. An example will be described in which the analysis server 104 calculates the lifetime of a consumable component based on the number of times of use of the consumable component and the use condition (history information, described hereinafter, particularly the switching timing) of the image forming apparatus 101 other than the number of use times of the log information, and notifies the image forming apparatus 101 of the calculated life time.

Figure 4A:
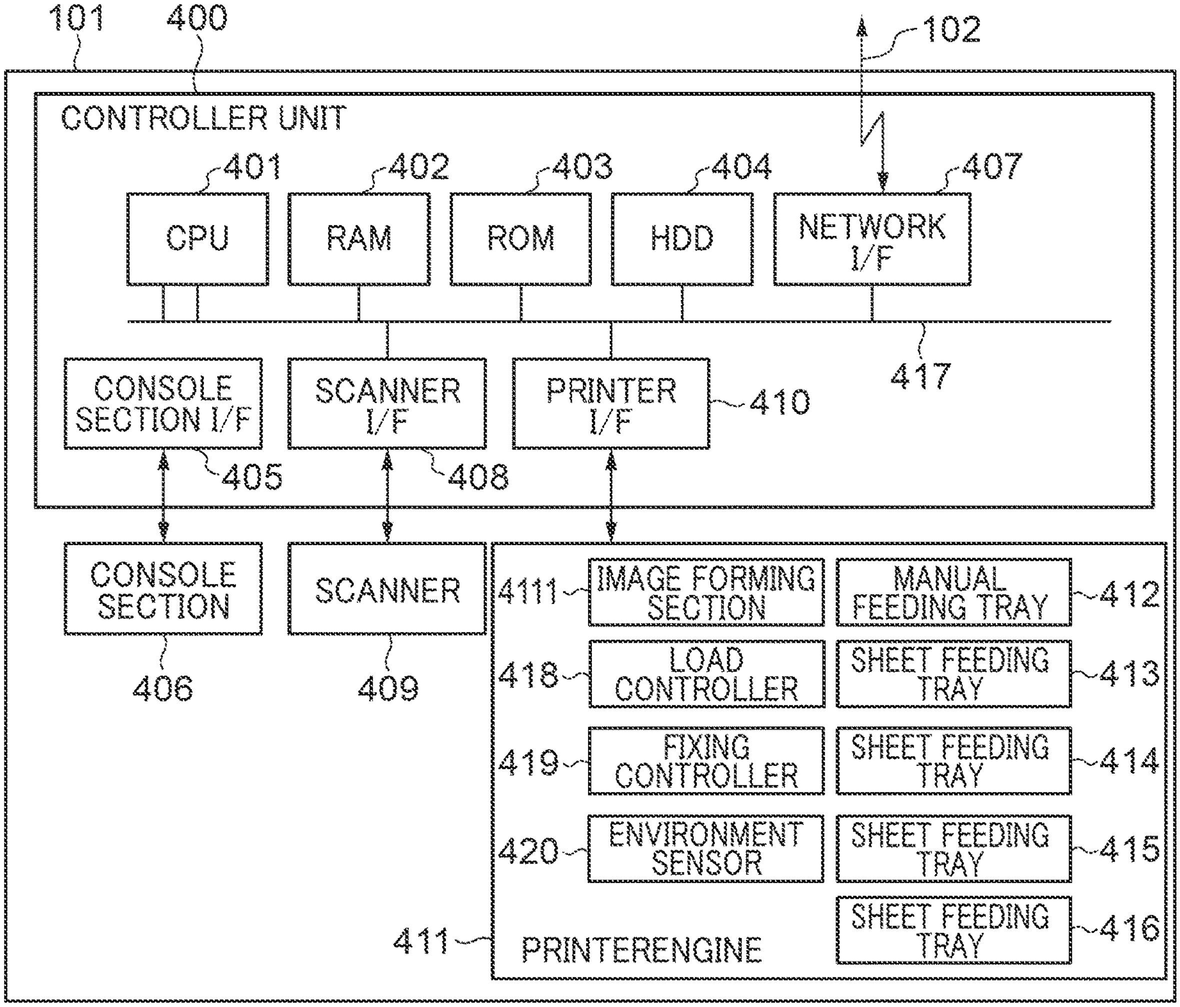
FIGS. 4A and 4B are schematic block diagrams of hardware of the image forming apparatus and an analysis server, respectively.

FIG. 4A is a schematic block diagram of hardware configuration of the image forming apparatus. As shown in FIG. 4A, the image forming apparatus 101 includes the controller unit 400, a console section 406, the scanner 409, and a printer engine 411. The controller unit 400 is electrically connected to the console section 406, the scanner 409, and the printer engine 411. Further, the controller unit 400 is a computer and includes a CPU 401, a RAM 402, a ROM 403, an HDD 404, a console section interface 405, a network interface 407, a scanner interface 408, and a printer interface 410. The CPU 401, the RAM 402, the ROM 403, the HDD 404, the console section interface 405, the network interface 407, the scanner interface 408, and the printer interface 410 are electrically interconnected via a system bus 417.

The CPU 401 performs a variety of controls based on control programs and the like which are stored in the ROM 403 and the HDD 404. Examples of the control programs include programs for causing the CPU 401 to execute control of the components and the units of the image forming apparatus 101 (method of controlling the image forming apparatus 101). For example, the CPU 401 outputs image signals as output information to the printer engine 411 connected thereto via the printer interface 410. The RAM 402 functions as a main memory, a work area, and the like for the CPU 401. For example, the RAM 402 is used as an area where output information is loaded, an area for storing environment data, and so forth, and may be implemented by an NVRAM. The ROM 403 stores the programs executed by the CPU 401. For example, the ROM 403 can also store programs for executing processing operations by a software module 500, described hereinafter. The HDD 404 stores font data, an emulation program, form data, and so forth. The console section interface 405 is an interface for the console section 406 having a touch panel-type display section. For example, the console section interface 405 outputs screen data to be displayed on the display section of the console section 406 to the console section 406. Further, the console section interface 405 acquires information from the console section 406, which is input thereto by the user, and transfers the acquired information to the CPU 401. The network interface 407 is an interface used by the image forming apparatus 101 to communicate with the communication apparatus 103 and the analysis server 104 on the network 102. For example, the network interface 407 receives print data, an instruction for changing a variety of settings, and so forth, from the communication apparatus 103. The scanner interface 408 controls the scanner 409 to read an original. The printer interface 410 outputs image signals transmitted from the CPU 401 to the printer engine 411.

The printer engine 411 includes a plurality of sheet feeding sections, such as the manual feeding tray 412 and the four sheet feeding trays 413 to 416, an image forming section 4111, a load controller 418, a fixing controller 419, and an environment sensor 420 for measuring a temperature and a humidity. The printer engine 411 prints an image on a sheet fed from a sheet feeding section (tray) designated by the user based on a print instruction received from the printer interface 410. The printer engine 411 can switch print control according to the print instruction received from the CPU 401, a print mode setting, sheet brand information set to each sheet feeding section, and information acquired from the environment sensor 420. For example, the printer engine 411 refers to a basis weight of the specified sheet brand information and acquires a temperature and a humidity from the environment sensor 420 and can perform print control such that the print control is switched to a print speed and a print temperature which are suitable for a sheet having the basis weight of the specified sheet brand information. More specifically, in a case where the basis weight is large, the printer engine 411 instructs the image forming section 4111 and the load controller 418 to set the conveying speed to a half speed and controls the fixing controller 419 to set a high fixing temperature. Further, the printer engine 411 can notify the CPU 401 of the information acquired by the environment sensor 420 via the printer interface 410. Note that the image forming section 4111 is a name used when collectively referring to the image forming units 1Y to 1K. Further, although in the present embodiment, the environment sensor 420 functions as detecting means for detecting environmental conditions including a temperature and a humidity around the image forming section 4111 when a print job is executed, as the environmental conditions, not only the temperature and the humidity, but any other condition may be added.

Figure 4B:
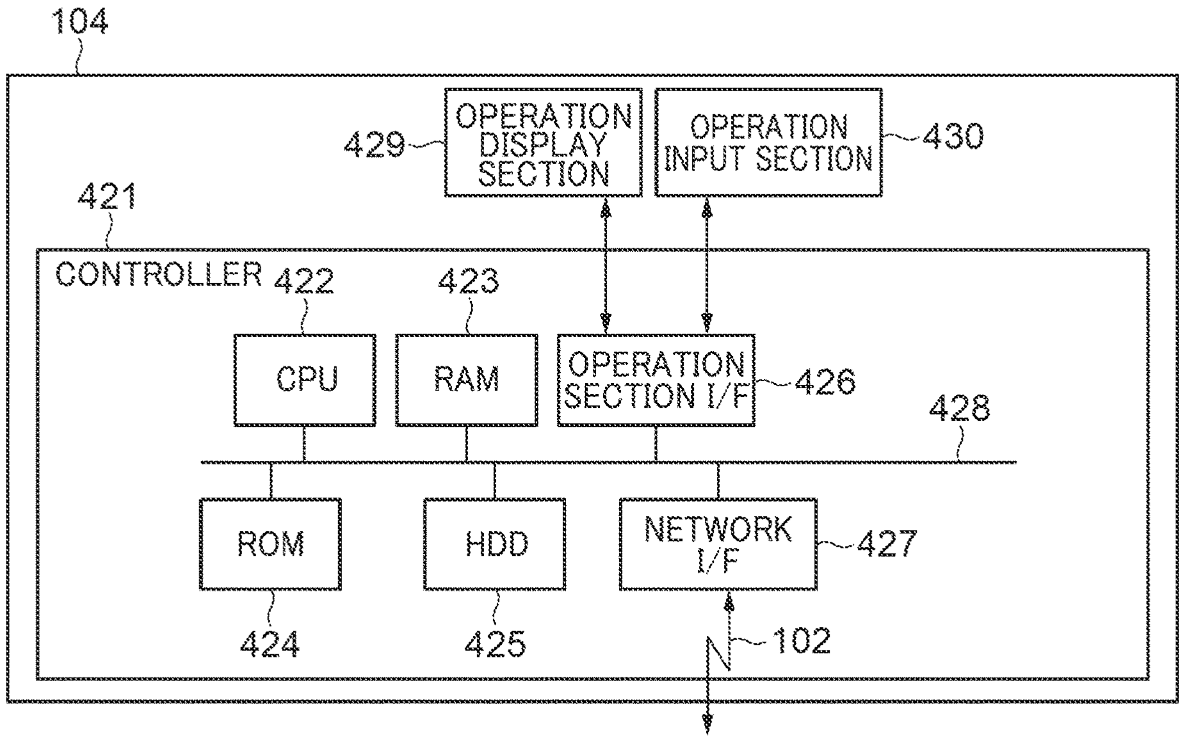

FIG. 4B is a schematic block diagram of hardware configuration of the analysis server. The analysis server 104 is electrically connected to the image forming apparatus 101 via the network 102 and receives log information transmitted from the image forming apparatus 101. Further, the analysis server 104 analyzes the log information received from the image forming apparatus 101 and transmits information on the lifetime of a consumable component, and so forth, to the image forming apparatus 101, as a result of the analysis. As shown in FIG. 4B, the analysis server 104 includes a controller 421 which can be connected to the network 102, an operation display section 429, and an operation input section 430. The controller 421 has a CPU 422 that executes a variety of control programs and controls the overall operation of the analysis server 104. Further, the controller 421 has a RAM 423, a ROM 424, an HDD 425, an operation section interface 426, and a network interface 427, which are interconnected via a system bus 428. The CPU 422 reads the control programs stored in the ROM 424 and the HDD 425 and executes predetermined processing using the RAM 423 as a work area. The HDD 425 stores a variety of control programs, such as a control program for instructing the image forming apparatus 101 to transmit a log. Further, the HDD 425 also stores information on a log type, and so forth, which is to be transmitted to the image forming apparatus 101. The network interface 427 controls inputting and outputting of information via the network 102. The operation section interface 426 performs communication control for outputting data to the operation display section 429 and communication control for inputting data from the operation input section 430. The operation display section 429 is a display interface to the user, and includes a display device, such as an LCD and an LED. The operation input section 430 is an interface for inputting an instruction from the user, and includes an input device, such as a keyboard and a mouse.

Figure 5A:
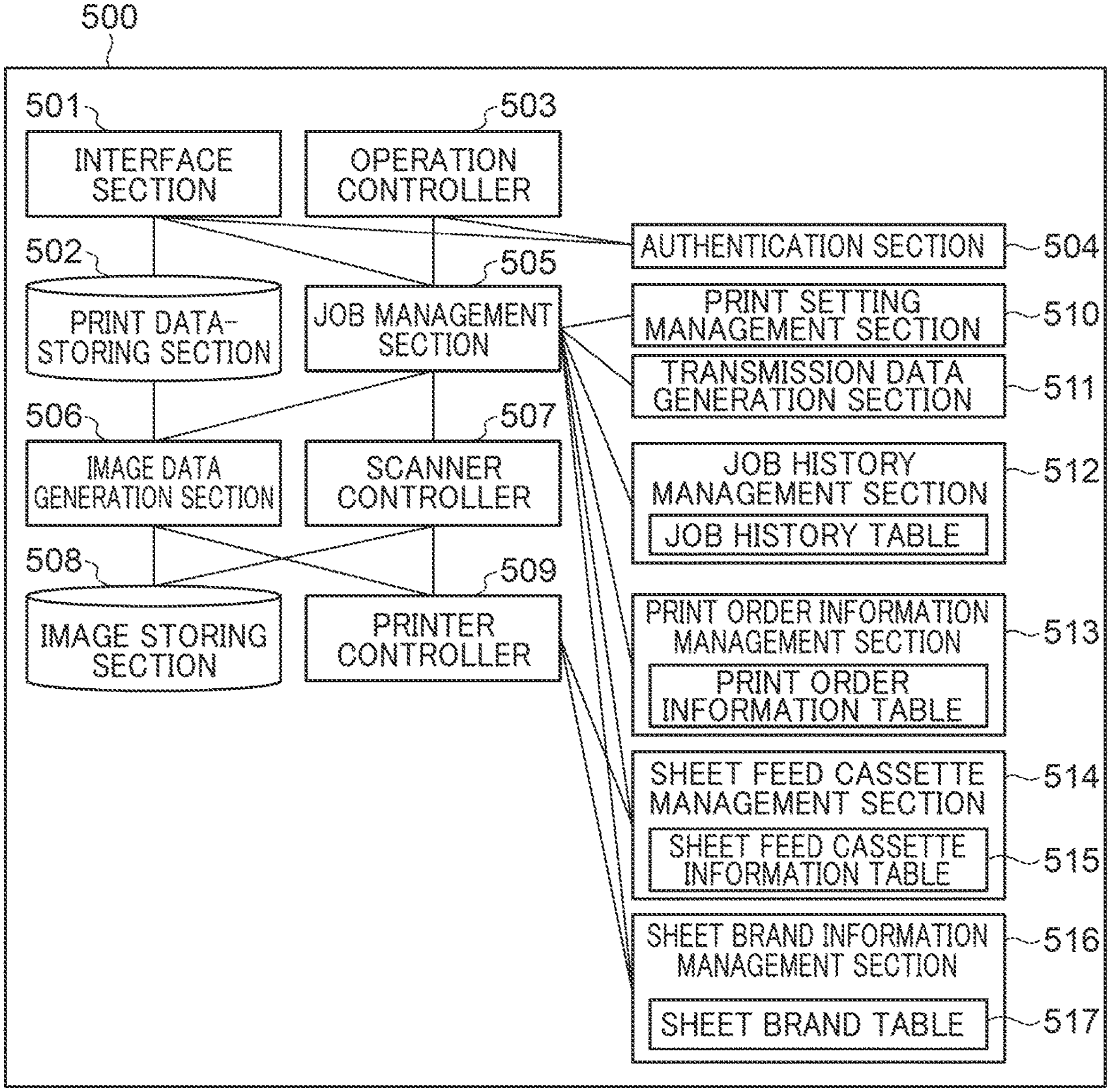
FIGS. 5A and 5B are block diagrams schematically showing software modules of the image forming apparatus and the analysis server, respectively.
Figure 5B:
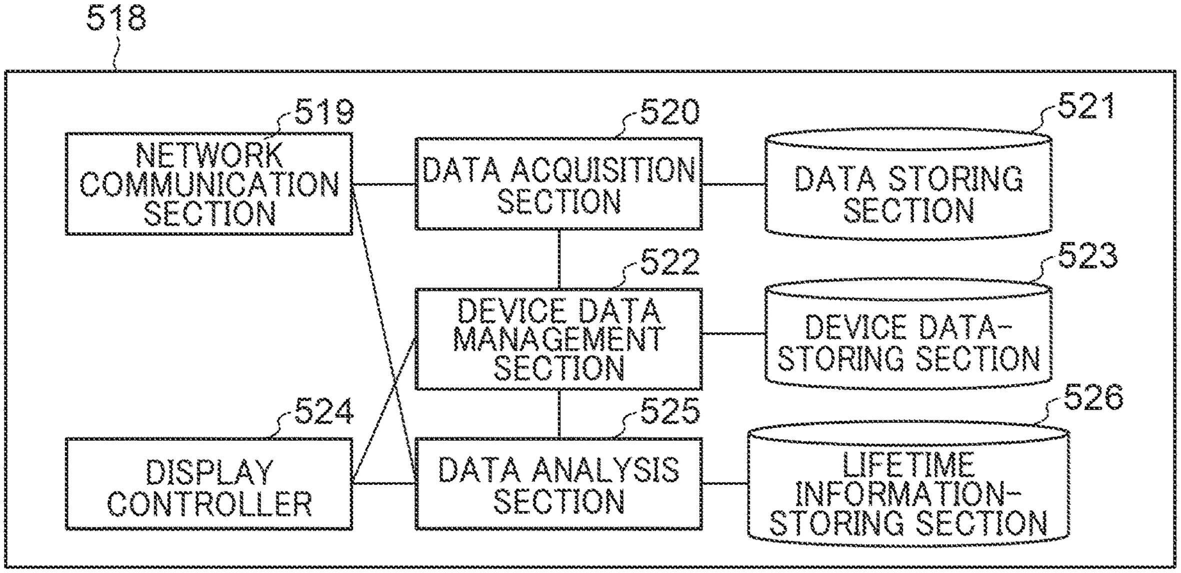

FIGS. 5A and 5B are block diagrams schematically showing software modules of the image forming apparatus 101 and the analysis server 104, respectively. As shown in FIG. 5A, the software module 500 of the image forming apparatus 101 has an interface section 501, a print data-storing section 502, an operation controller 503, an authentication section 504, and a job management section 505. Further, the software module 500 has an image data generation section 506, a scanner controller 507, an image storing section 508, a printer controller 509, a print setting management section 510, a transmission data generation section 511, and a job history management section 512. Further, the software module 500 has a print order information management section 513, a sheet feed cassette management section 514, and a sheet brand information management section 516. The processing operations using the software module 500 are executed by the CPU 401 that executes associated programs stored e.g. in the ROM 403.

The software module 500 is a module used by the image forming apparatus 101 to communicate with an external apparatus, such as the communication apparatus 103. The image forming apparatus 101 is capable of receiving print data from the communication apparatus 103 on the network 102 via the interface section 501, and further, transmitting history information and sheet information, described hereinafter, of a print job for performing printing using print data, to the analysis server 104. Thus, the interface section 501 (software module 500) functions as notifying means for performing a notification step for notifying the analysis server 104 of a variety of information including the history information. The print data-storing section 502 temporarily stores print data in the RAM 402 and the HDD 404.

The operation controller 503 controls the console section 406 to receive a user login request, a copy instruction, a scan transmission instruction, and so forth, which are provided to the image forming apparatus 101. For example, the operation controller 503 displays a login form (not shown) for receiving a user login request on the console section 406. Upon receipt of the user login request, the operation controller 503 outputs authentication information including a user name, a password, and so forth, input to the login form, to the authentication section 504 and requests the authentication section 504 to perform authentication. If the authentication performed by the authentication section 504 is successful, the operation controller 503 receives an authentication ID from the authentication section 504. Then, the operation controller 503 holds the user name of the user logged into the image forming apparatus 101 and the authentication ID until a logout request is received. When an issue of a job, such as a copy job, is instructed by the user operation, the operation controller 503 outputs a job issuing request, and the user name and the authentication ID held therein to the job management section 505. Further, when a logout operation is performed by the user on the console section 406, the operation controller 503 performs logout processing. In the operation controller 503, a time-out time is set in advance, and in a case where the console section 406 has not received the user operation until the time-out time expires, the operation controller 503 performs the logout processing. Note that the user can refer to the time-out time set in advance from the console section 406. Further, the user can refer to the time-out time also from an external apparatus, such as the communication apparatus 103 and the analysis server 104. In the logout processing, the operation controller 503 sends a logout notification to the authentication section 504 with the user name, the authentication ID, and logout cause information, and discards the authentication information and the authentication ID.

The authentication section 504 is a module that performs the authentication processing and holds an authentication information table. The authentication section 504 acquires the authentication information input by the user to the login form displayed on the console section 406 from the operation controller 503. Then, the authentication section 504 performs the authentication processing by comparing the acquired authentication information and a user name and a password which are registered in the authentication information table. Note that in the present embodiment, the authentication section 504 of the software module 500 of the image forming apparatus 101 holds the authentication information table, this is not limitative, but the authentication section 504 may acquire the authentication information table e.g. from an authentication server (not shown) and perform the authentication processing using the acquired authentication information table. If the authentication is successful, the authentication section 504 issues an authentication ID and outputs the issued authentication ID to the operation controller 502 together with a result indicating whether or not the authentication is successful.

The job management section 505 manages information associated with a job (hereinafter referred to as the "job information") executed by the image forming apparatus 101. The job information includes information on a start time of a job, the user name of a user having instructed execution of the job, output attribute information, and so forth. The output attribute information includes the number of copies, information indicating one of monochrome printing/color printing, a sheet type, a sheet brand, and so forth. For example, in a case where the user instructs execution of a job by operating the console section 406, the job management section 505 acquires the output attribute information and the user name from the operation controller 503.

The image data generation section 506 acquires print data stored in the RAM 402 or the HDD 404 based on the job information managed by the job management section 505. Then, the image data generation section 506 generates image data by performing an image formation process based on the acquired print data. The scanner controller 507 controls the scanner 409 to read an original and generate image data of the read original. The image storing section 508 temporarily stores the image data generated by the image data generation section 506 and the scanner controller 507 in the RAM 402 or the HDD 404. The printer controller 509 controls the printer engine 411 to print the image data stored in the RAM 402 or the HDD 404 by the image storing section 508. Thus, the printer controller 509 (software module 500) functions as executing means for performing an execution step for causing the printer engine 411 (image forming section 4111) to execute a print job for printing image data. The print setting management section 510 manages print setting information to be notified to the printer controller 509 when the job management section 505 instructs execution of a print job. The printer controller 509 operates to switch the print control based on print settings managed by the print setting management section 510. The managed print settings are print mode-switching settings for mixed sheets, as shown in FIG. 6E.

The transmission data generation section 511 collects information for generating a job execution log, described hereinafter. Note that the job execution log is transmitted to the analysis server 104. For example, the transmission data generation section 511 collects job history information from the job history management section 512, print order information from the print order information management section 513, and sheet information of a sheet feeding section used in a job from the sheet feed cassette management section 514 and the sheet brand information management section 516. Note that the sheet information includes information on the name of a sheet, a sheet size, and a sheet brand ID. The transmission data generation section 511 converts these information items to a format output to the analysis server 104 and stores the converted information in the RAM 402 and the HDD 404. The job history management section 512 manages the history information of jobs executed by the image forming apparatus 101. When the image forming apparatus 101 completes a job, the job history management section 512 acquires the job information of this job from the job management section 505 and records the acquired job information in a job history information table, an example of which is described with reference to FIG. 18 hereinafter, as the history information of the job. Thus, the job history management section 512 (software module 500) functions as acquiring means for performing an acquisition step for acquiring, after a print job is executed by the printer controller 509, the history information of the print job. This history information includes the history information of a print job, which can specify switching timing between a first step and a second step, described hereinafter. The print order information management section 513 manages sheet information of sheets on which the printer controller 509 performs printing and print order information in which print attributes have been sequentially recorded. When the printer controller 509 receives a print instruction, the print order information management section 513 acquires print order information by receiving a notification about the contents of the print instruction, and records the acquired print order information in a print order information table.

The sheet feed cassette management section 514 records and manages the sheet information in a sheet feed cassette information table 515. The sheet feed cassette management section 514 updates the sheet feed cassette information table 515 based on the sheet information input by the user to the console section 406 or the sheet information detected by a sensor of the printer engine 411 when the user sets sheets in the sheet feeding section. The sheet brand information management section 516 functions as a database for managing sheet brand information as detailed information of sheets to be used for printing. The sheet brand information management section 516 registers the sheet brand information input by the user to the console section 406 in a sheet brand table 517 according to a registration instruction provided by the user. In the sheet brand table 517, the name of a sheet is managed in association with a sheet brand ID. Further, the sheet brand information management section 516 can also update the sheet brand table 517 according to a registration instruction received from the communication apparatus 103.

As shown in FIG. 5B, a software module 518 of the analysis server 104 includes a network communication section 519, a data acquisition section 520, and a data storing section 521. Further, the software module 518 includes a device data management section 522, a device data-storing section 523, a display controller 524, a data analysis section 525, and a lifetime information-storing section 526. The processing operations using the software module 518 are executed by the CPU 422 that executes programs stored e.g. in the ROM 424.

The network communication section 519 is a module used by the analysis server 104 to communicate with an external apparatus, such as the image forming apparatus 101. The analysis server 104 can receive log information, such as history information, from the software module 500 of the image forming apparatus 101 on the network 102 via the network communication section 519. Thus, the network communication section 519 functions as analysis server acquisition means for acquiring log information (history information) notified from the software module 500. Further, the analysis server 104 can also transmit analyzed lifetime information and the like, to the image forming apparatus 101 via the network communication section 519. The data acquisition section 520 acquires the information on the image forming apparatus 101, which is stored in a log received by the analysis server 104, and instructs the data storing section 521 to store the acquired information. The data storing section 521 stores the information extracted from the received log in the RAM 423 and the HDD 425.

The device data management section 522 aggregates and manages the information on the image forming apparatus 101, which is acquired by the data acquisition section 520, as the information on each image forming apparatus 101. Further, for example, in a case where a plurality of image forming apparatuses 101 that communicate with the analysis server 104 exist, the device data management section 522 identifies the image forming apparatus 101 from which the information has been acquired, based on a serial number for uniquely identifying the image forming apparatus 101, which is extracted from the log information. Then, the device data management section 522 aggregates the identified information as the information on the image forming apparatus 101, and the device data-storing section 523 stores the aggregated information on the image forming apparatus 101 in the RAM 423 or the HDD 425.

The display controller 524 controls the operation section interface 426 to display a screen, such as a maintenance information screen 700, described hereinafter, on the operation display section 429. Examples of the contents to be displayed here include data aggregated for each device according to an instruction from the device data management section 522 and the lifetime information analyzed by the data analysis section 525.

The data analysis section 525 analyzes the lifetime of the consumable components used by each image forming apparatus 101 based on the data managed by the device data management section 522. In a case where the data acquisition section 520 acquires a job execution log, and the device data management section 522 updates a job execution result, counter information, and the like, the data analysis section 525 recalculates the number of remaining days of the lifetime of the consumable component whose lifetime has changed, based on the updated information. The data analysis section 525 stores a result obtained by recalculating the number of remaining days of the life time of the consumable component in RAM 423 and the HDD 425, using the lifetime information-storing section 526. Further, the data analysis section 525 notifies the image forming apparatus 101 (software module 500) of the recalculation result (result of determination of the lifetime). Then, the recalculation result is displayed on the console section 406. Thus, the console section 406 functions as displaying means for displaying a recalculation result. With this, the user can grasp the number of remaining days over which the consumable component can be used. Further, in a case where the data acquisition section 520 acquires a component replacement completion log, and the device data management section 522 updates the consumable component information, the data analysis section 525 updates a lifetime calculation logic of the replaced consumable component. The data analysis section 525 updates the lifetime calculation logic of the replaced consumable component based on the assumed number of use times of the replaced component, the number of use times after the last replacement (component counter), and the total value totalized for each sheet attribute, from the job execution log, and so forth. As described hereinafter, when a mixed-sheet job is executed, the printer engine 411 switches the print operation between the first step and the second step. The information processing system 100 is characterized in that when calculating the lifetime, the number of times of switching the print operation is considered. Further, the data analysis section 525 also functions as specifying means for specifying the switching timing of the print operation based on the history information acquired by the network communication section 519. Further, when updating the lifetime calculation logic of the component, the data analysis section 525 may update the lifetime calculation logic using the information obtained when the component was replaced before last time and the information obtained when the component in the same product other than the target image forming apparatus 101 as a target was replaced. The lifetime information-storing section 526 stores the number of remaining days as the lifetime information of each consumable component of the image forming apparatus 101, the calculation logic of the lifetime information, and the parameters, in the RAM 423 and the HDD 425.

FIG. 16 is a diagram showing an example of the sheet feed cassette information table 515 managed by the sheet feed cassette management section 514. In the sheet feed cassette information table 515, the sheet information set to the sheet feeding sections (the sheet feeding tray 413, and so forth) of the image forming apparatus 101 is recorded. Although in the present embodiment, a sheet feed cassette (sheet feeding section), a sheet size, a sheet name, and a sheet brand ID are included in this sheet information, this is not limitative, but for example, any other item may be included. Further, as the sheet feed cassette, a name of each sheet feed cassette is recorded. In the present embodiment, "sheet feed cassette 1" indicating the sheet feeding tray 413, "sheet feed cassette 2" indicating the sheet feeding tray 414, "sheet feed cassette 3" indicating the sheet feeding tray 415, "sheet feed cassette 4" indicating the sheet feeding tray 416, and "manual feeding tray" indicating the manual feeding tray 412 are recorded by way of example. As the sheet size, a sheet size of sheets accommodated in an associated one of the sheet feed cassettes is recorded. When the user sets sheets in the sheet feed cassette, a sheet size detected by the sensor of the printer engine 411 or a sheet size input by the user to the console section 406 is recorded as the sheet size. As the sheet name, a name of sheets accommodated in an associated one of the sheet feed cassettes is recorded. As the sheet brand ID, an identification number for identifying the sheet brand information of sheets accommodated in an associated one of the sheet feed cassettes from the sheet brand table 517 is recorded. The information items recorded as the sheet name and the sheet brand ID are determined based on the sheet brand information set on a sheet setting screen 600, described hereinafter with reference to FIG. 6A.

FIG. 17 is a diagram showing an example of the sheet brand table 517 managed by the sheet brand information management section 516. In the sheet brand table 517, the sheet brand information formed by a plurality of sheet parameters necessary for executing a print job is registered (recorded). Although the sheet brand information includes information on a sheet brand ID, a sheet name, a sheet type, a basis weight of a sheet, surface property of the sheet, a color of the sheet, and a feature of the sheet, this is not limitative, but, for example, any other item may be included. The sheet brand ID is an identifier for identifying the sheet brand information registered in the sheet brand table 517. As the sheet name, the name of a sheet included in the registered sheet brand information is set. As the type, one of "basic setting" indicting the sheet brand information held by the image forming apparatus 101 in advance and "user setting" indicating the sheet brand information set by the user is set as desired. As the basis weight, a basis weight included in the registered sheet brand information is set. As the surface property, information on the surface property included in the registered sheet brand information is set. As the color, a color of the sheet, included in the registered sheet brand information, is set. As the feature, information on the feature of the sheet, included in the registered sheet brand information, is set.

FIG. 18 is a diagram showing an example of the job history information (job history information table) managed by the job history management section 512. The job history information is formed by basic information, print setting information, output information, and print order information, and one job history information item is generated with respect to one job. In the present embodiment, a job identification number is used as a key, and the job history information is held in the job history information table managed by the job history management section 512 for each job identification number. The basic information includes, for example, a job identification number, a user name, print-start date and time, and print-end date and time, and may further include a document name and so forth, but this is not limitative. The job identification number is a value which is uniquely and serially issued in the image forming apparatus 101, and the analysis server 104 manages the job history information of the image forming apparatus 101 using this value. The print setting information is transmitted from the job management section 505 together with the basic information when a print job is executed. The output information includes the total number of printed pages, the total number of delivered sheets, the numbers of color-printed sides and sheets, and the numbers of monochrome-printed sides and sheets. Note that in a case where a plurality of types of sheets are used in one job, the numbers of color-printed sides and sheets and the numbers of monochrome-printed sides and sheets are included in the job history information as respective information items for used sheet brand IDs. For example, a case will be described where print jobs have been executed for performing color-printing using one of the A4-size sheets set in the sheet feeding tray 413 and one of the A3-size sheets set in the sheet feeding tray 416, respectively. In this case, a value of "1" is recorded as the number of A4-size sheets in the sheet feeding tray 413, on which color printing has been performed, and a value of "1" is recorded as the number of A3-size sheets in the sheet feeding tray 416, on which color printing has been performed. The print order information includes information on a sheet feed cassette, a color mode, and a printed side, which are recorded as the information on printing for each print instruction, and further may include a temperature and a humidity around the image forming section 4111. Note that the information on printing is recorded for each set of printing operations, and hence in a case where a plurality of pages have been printed in one job, the information items corresponding in number to the number of printed pages are recorded. For example, a case will be described where in a print job for printing two pages by specifying single-sided color printing, thin paper is designated for the first page and thick paper is designated for the second page. As the print order information in this case, the sheet feed cassette 3, color, and the front side are recorded in the information on the first page, and the sheet feed cassette 2, color, and the front side are recorded in the information on the second page.

Figure 6A:
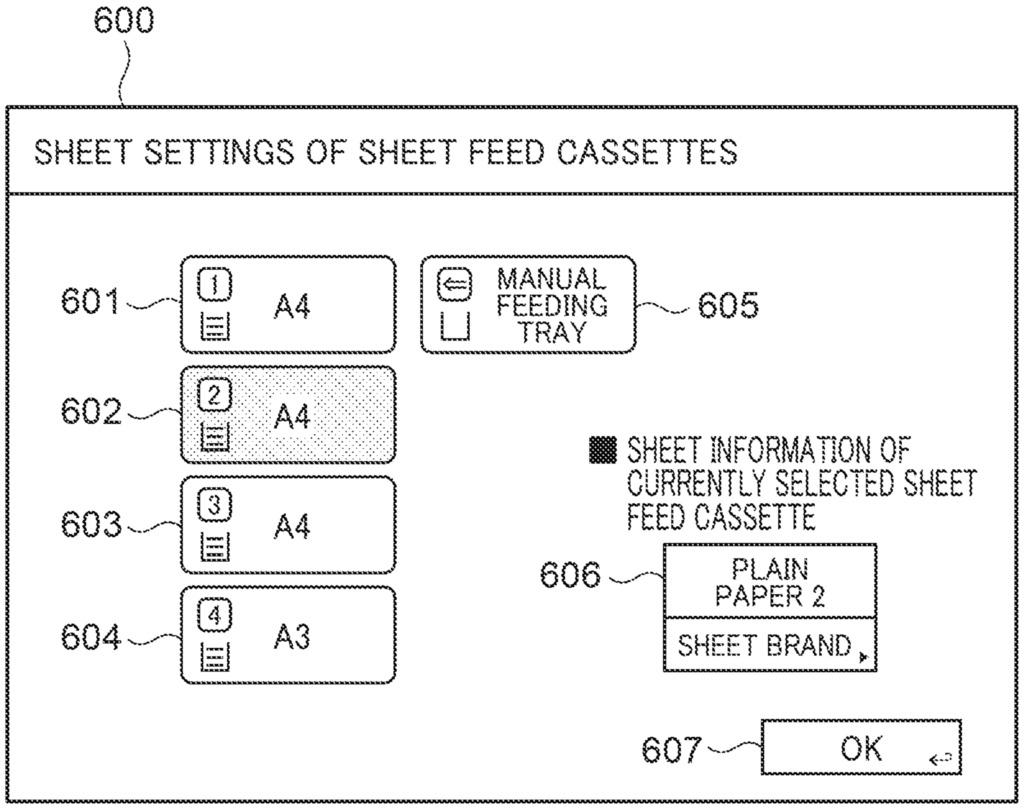
FIGS. 6A to 6F are diagrams each showing an example of a screen displayed on a console section of the image forming apparatus.

FIG. 6A is a diagram showing an example of the sheet setting screen 600 displayed on the console section 406. The sheet setting screen 600 is displayed when the user selects a sheet setting item of a sheet feed cassette on the user mode-setting screen (not shown) displayed by pressing a set key (not shown) of the console section 406. The sheet setting screen 600 is a screen for enabling the user to select a sheet feed cassette for which the sheet information is set. The sheet setting screen 600 has a sheet feed cassette-designating button (sheet feeding section-designating button) 601, a sheet feed cassette-designating button 602, a sheet feed cassette-designating button 603, a sheet feed cassette-designating button 604, a sheet feed cassette-designating button 605, a sheet brand button 606, and an OK button 607.

The sheet feed cassette-designating buttons 601 to 604 correspond to the sheet feeding trays 413 to 416, respectively. The sheet feed cassette-designating buttons 601 to 604 each display a sheet size set for the associated sheet feed cassette and a remaining amount of sheets accommodated in the associated sheet feed cassette. The sheet feed cassette-designating button 605 corresponds to the manual feeding tray 412. In a case where sheets are set on the manual feeding tray 412, a sheet size and a remaining amount of the sheets set on the manual feeding tray 412 are displayed on the sheet feed cassette-designating button 605. On the other hand, in a case where no sheet is set on the manual feeding tray 412, a sheet size and a remaining amount are not displayed on the sheet feed cassette-designating button 605. Further, in a case where the user presses one of the sheet feed cassette-designating buttons 601 to 605, for example as shown in FIG. 6A, if the user presses the sheet feed cassette-designating button 602, the sheet feeding tray 414 corresponding to the sheet feed cassette-designating button 602 is selected. Further, in this case, the sheet name set to the sheet feeding tray 414 in the selected state is displayed on the sheet brand button 606. In a case where the user presses this sheet brand button 606, the screen on the console section 406 is shifted to a sheet brand management screen 614 shown in FIG. 6C. Further, in a case where the user presses the OK button 607, a sheet brand ID associated with the information selected on the sheet brand management screen 614 is recorded as the sheet brand ID associated with the sheet feeding tray 414 on the sheet feed cassette information table 515. Although in the present embodiment, in setting the sheet size of each sheet feed cassette, a sheet size measured by a size detection device included in the printer engine 411 is set, this is not limitative. For example, in a case where the size detection function of the printer engine 411 is omitted, the user may input and set a sheet size on a setting screen displayed on the console section 406.

Figure 6B:
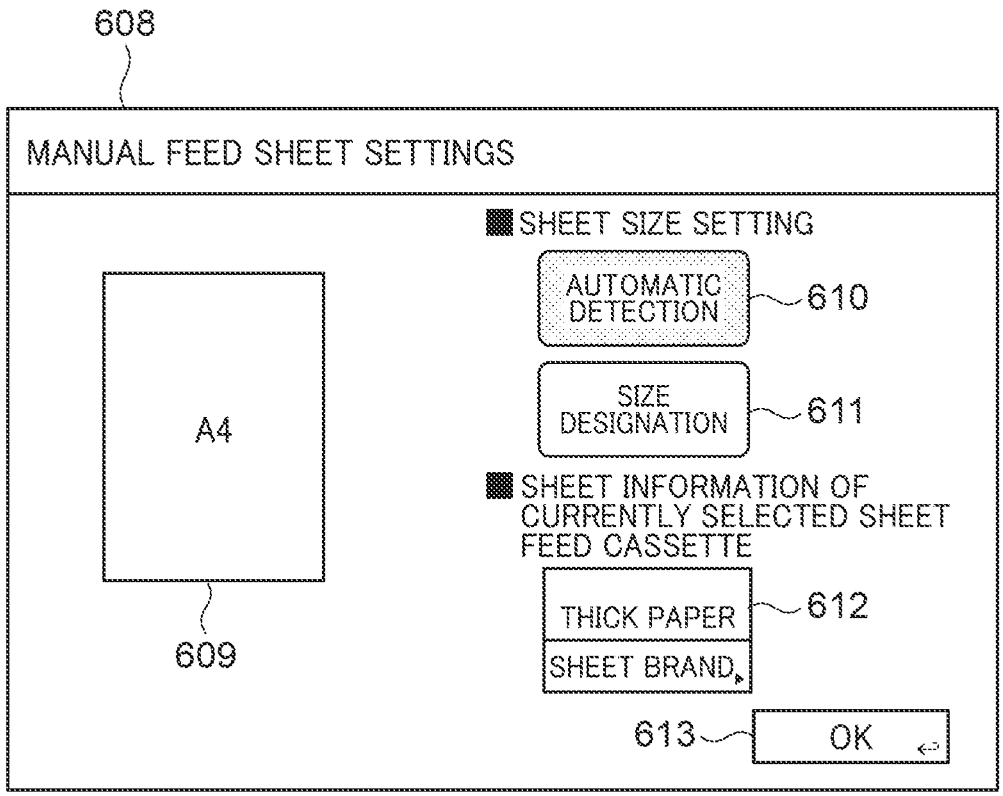

FIG. 6B is a diagram showing an example of a manual feed sheet settings screen 608 displayed on the console section 406. The manual feed sheet settings screen 608 is displayed on the console section 406 when the printer engine 411 detects that a sheet or sheets is/are set on the manual feeding tray 412. The manual feed sheet settings screen 608 has a sheet size-displaying area 609, an automatic detection button 610, a sheet size designation button 611, a sheet brand button 612, and an OK button 613.

The sheet size-displaying area 609 is an area for displaying the sheet size of a sheet or sheets set on the manual feeding tray 412. The sheet size-displaying area 609 displays a sheet size set by one of the automatic detection button 610 and the sheet size designation button 611, which has been selected by the user. For example, in a case where the user selects the automatic detection button 610, the sheet size of the sheet/sheets set on the manual feeding tray 412 is measured by a sheet size detection function of the printer engine 411. Then, this sheet size is displayed in the sheet size-displaying area 609. On the other hand, in a case where the user selects the sheet size designation button 611, a sheet size input by the user on a sheet size-setting screen (not shown) displayed on the console section 406 is displayed in the sheet size-displaying area 609. The sheet brand button 612 is a button for setting the sheet brand information of a sheet or sheets set on the manual feeding tray 412. When the user presses the sheet brand button 612, the screen on the console section 406 is shifted to the sheet brand management screen 614 shown in FIG. 6C. When the user presses the OK button 613, the set sheet size and sheet brand information are recorded in the sheet feed cassette information table 515 in the RAM 402 as the sheet size and the sheet brand information of the manual feeding tray 412.

Figure 6C:
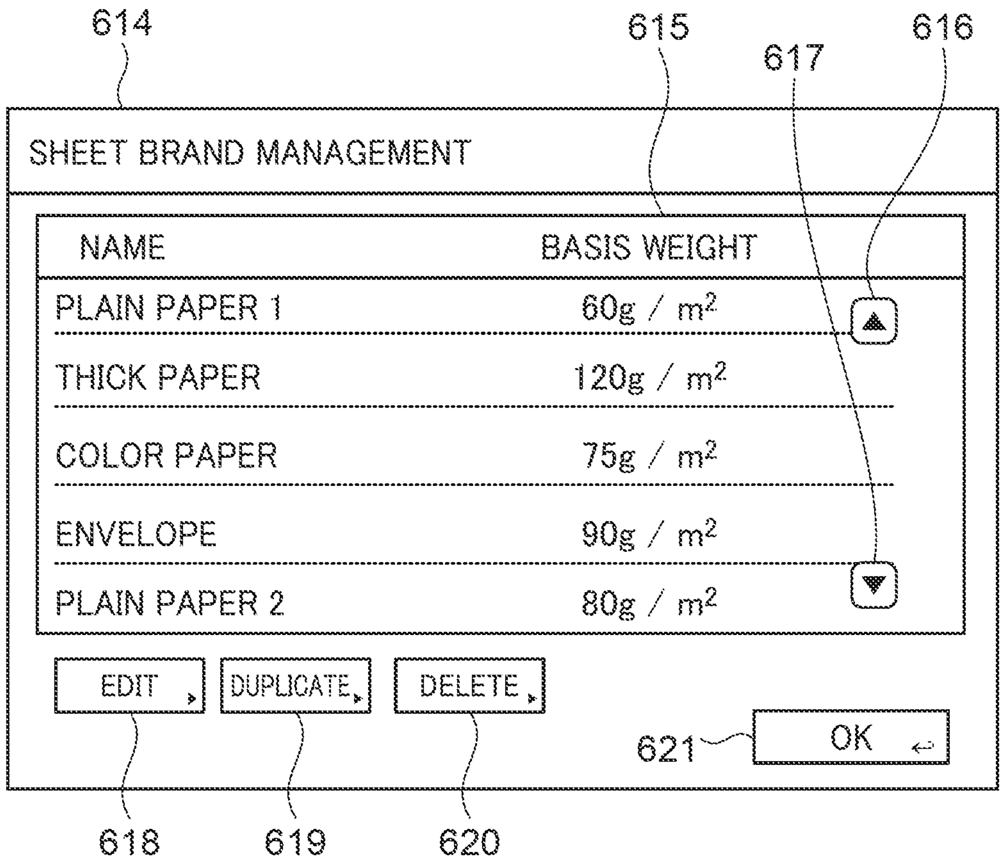

FIG. 6C is a diagram showing an example of the sheet brand management screen 614 displayed on the console section 406. The sheet brand management screen 614 is displayed when the user presses the sheet brand button 606 on the sheet setting screen 600 or the sheet brand button 612 on the manual feed sheet settings screen 608. The sheet brand management screen 614 has a sheet brand display section 615, a list scroll button 616, a list scroll button 617, an edit button 618, a duplication button 619, a delete button 620, and an OK button 621.

The sheet brand display section 615 displays the sheet brand information recorded in the sheet brand table 517 in the form of a list. In FIG. 6C, a sheet name and a basis weight as part of the sheet brand information are displayed in the form of a list, by way of example. The list scroll button 616 and the list scroll button 617 are buttons for scrolling the sheet brand display section 615. The edit button 618 is a button for editing the sheet brand information selected in the sheet brand display section 615. When the user presses the edit button 618 in a state in which one of the sheet brand information items in the sheet brand display section 615 is selected, the screen on the console section 406 is shifted to a sheet brand-setting screen 622 shown in FIG. 6D. The duplication button 619 is a button for duplicating the sheet brand information selected in the sheet brand display section 615. When the user presses the duplication button 619, the same information as the sheet brand information selected in the sheet brand display section 615 is duplicated in the sheet brand table 517. The delete button 620 is a button for deleting the selected sheet brand information from the sheet brand table 517. When the user presses the delete button 620, the selected sheet brand information is deleted from the sheet brand table 517. Note that the edit button 618, the duplication button 619, and the delete button 620 can be pressed in a case where one of the sheet brand information items in the sheet brand display section 615 is selected. The OK button 621 is a button for reflecting editing, duplication, and deletion of the sheet brand information, which are performed on the sheet brand management screen 614, on the sheet brand information.

Figure 6D:
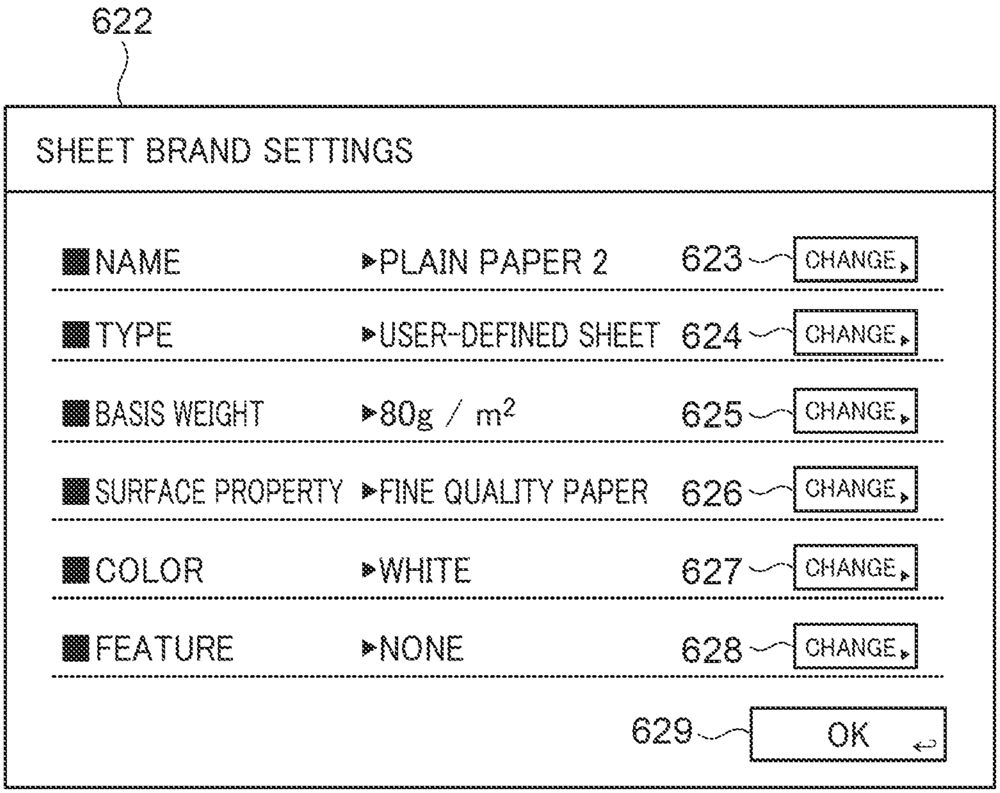
Figure 6E:
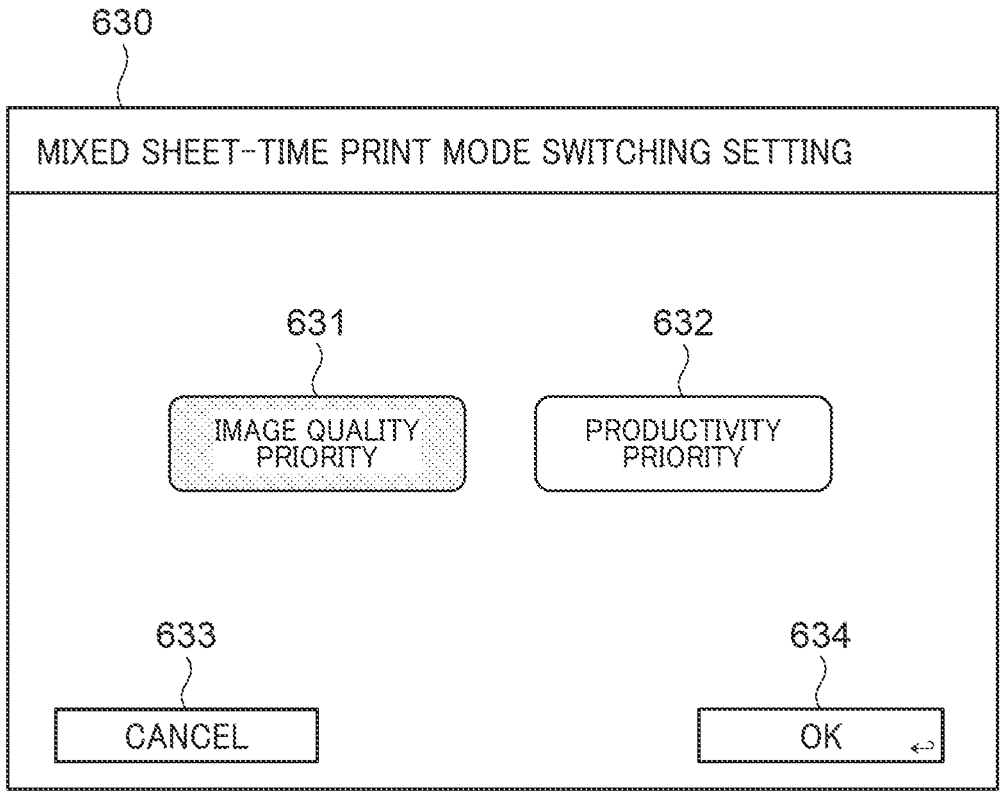

FIG. 6D is a diagram showing an example of the sheet brand-setting screen 622 displayed on the console section 406. The sheet brand-setting screen 622 is displayed when the user presses the edit button 618 on the sheet brand management screen 614. The sheet brand-setting screen 622 includes a change button 623, a change button 624, a change button 625, a change button 626, a change button 627, a change button 628, and an OK button 629.

The change buttons 623 to 628 are buttons for changing items of the sheet brand information selected on the sheet brand management screen 614, more specifically, the name of sheets, the type of sheets, a basis weight, surface property of sheets, the color of sheets, and the feature of sheets. For example, when the user presses the change button 623, the screen on the console section 406 is shifted to a sheet name-changing screen (not shown) for changing the name of sheets. The name of sheets, input to this sheet name-changing screen, is temporarily stored in the RAM 402. The OK button 629 is a button for reflecting the changed contents on the sheet brand information. When the user presses the OK button 629, the sheet brand information selected in the sheet brand display section 615, in the sheet brand table 517, is changed to values stored in the RAM 402. After that, the screen on the console section 406 is shifted to the sheet brand management screen 614.

FIG. 6E is a diagram showing an example of a mixed sheet-time print mode switching setting screen 630 displayed on the console section 406. The mixed sheet-time print mode switching setting screen 630 is one of print setting screens displayed when the user instructs print settings on the console section 406. The mixed sheet-time print mode switching setting screen 630 includes an image quality priority button 631, a productivity priority button 632, a cancel button 633, and an OK button 634.

The image quality priority button 631 and the productivity priority button 632 are buttons for specifying the print settings for setting the print control of the printer engine 411 when executing mixed sheet printing of print jobs, for sequentially printing data on a plurality of types of sheets. For example, in a case where the image quality priority button 631 is selected, the printer engine 411 executes mixed sheet printing in an image quality priority mode. In the image quality priority mode, the printer engine 411 individually specifies sheet attributes of each of the mixed sheets and operates while switching the print control to one suitable for the sheet attributes of each sheet to be printed. In a case where the productivity priority button 632 is selected, the printer engine 411 executes mixed sheet printing in a productivity priority mode. In the productivity priority mode, sheet attributes of the mixed sheets are not used, and the printer engine 411 executes printing by the same print control with respect to the sheets which are different in type without switching the print control. Note that in a case where one of the image quality priority button 631 and the productivity priority button 632 is selected, the other is released from the selected state. The cancel button 633 is a button for releasing the selected state of the image quality priority button 631 or the productivity priority button 632. The OK button 634 is a button for reflecting the setting set on the mixed sheet-time print mode switching setting screen 630. The mode associated with one of the image quality priority button 631 and the productivity priority button 632, which has been selected when the OK button 634 is pressed, is recorded as a print setting of the mixed sheet-time print mode in the RAM 402. The mixed sheet-time print mode switching setting is notified to the printer engine 411 as a print setting when printing is executed. Then, the printer engine 411 switches the determination criterion of the print control, which is used when printing of a mixed-sheet print job is executed. For example, it takes time to switch the print control, and hence, in a case where the productivity priority mode is set, the determination criterion of the printer engine 411 is changed so as to prevent the print control from being executed as much as possible. Further, in a case where the image quality priority mode is set, the determination criterion of the print control is changed so as to switch the print control to one suitable for the designated sheet attribute information.

Figure 6F:
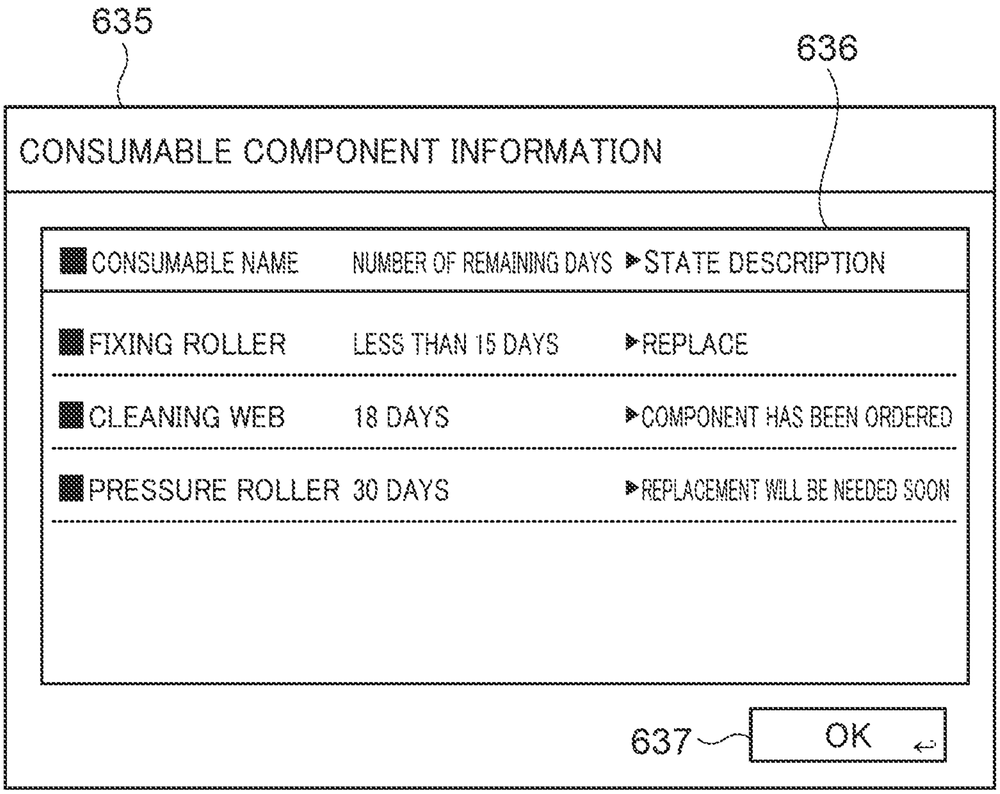

FIG. 6F is a diagram showing an example of a consumable component information screen 635 displayed on the console section 406. The consumable component information screen 635 is one of screens displayed when the user instructs a maintenance screen on the console section 406. The consumable component information screen 635 has an area 636 for displaying the consumable component information and an OK button 637. The area 636 displays consumable component names, the numbers of remaining usable days, and the descriptions of the current states, of ones of the consumable components included in the image forming apparatus 101, which are required to be replaced or to be prepared for replacement. The number of remaining usable days and the description of the current state are based on a result of analysis on the lifetime of the consumable component, which has been performed by the analysis server 104, or based on a result of counting the use frequency (usage condition) of each consumable component, which has been performed by the image forming apparatus 101. The OK button 637 is a button for closing the consumable component information screen 635 and shifting the screen to the original screen which was displayed immediately before the display of the consumable component information screen 635.

FIG. 19 is a diagram showing a relationship between a basis weight of each sheet and a fixing temperature set according to the mixed sheet-time print mode switching setting. In a case where the mixed sheet-time print mode switching setting is set to the image quality priority mode, the printer engine 411 operates, with the priority given to the accuracy of printing by performing the image formation and fixing control suitable for each sheet, but it is required to switch the image formation and fixing control at the timing of sheet switching, causing generation of a switching waiting time. More specifically, in a case where a print job in which sheets of thin paper and thick paper are mixed is executed when the image quality priority mode is set, the fixing control is performed with the fixing temperature 180° C. with respect to the thin paper. Then, when the sheet is switched from the thin paper to the thick paper, the temperature of the heat-fixing unit 300 is increased, and then the fixing control is performed with the fixing temperature 215° C. with respect to the thick paper. Further, in a case where the sheet is switched from the thick paper to the thin paper in the mixed sheet job, when the sheet is switched after printing on the thick paper, an idle rotation time of the heat-fixing unit 300 is generated so as to adjust the temperature. In a case where the productivity priority mode is set, printing is performed without switching the image formation control and the fixing control regardless of the sheet type, and hence it is possible to reduce the switching waiting time. More specifically, in a case where a print job in which sheets of thin paper and thick paper are mixed is executed, the fixing temperature is commonly fixed to 200° C., and hence when the printing is switched between thin paper printing and thick paper printing, it is possible to eliminate the time required to adjust the temperature. Although in the present embodiment, the mixed sheet-time print mode switching setting and switching of the print control based on a basis weight of sheets to be mixed are to be controlled in the fixing processing, this is not limitative. For example, the print control may be switched such that the sheet conveying speed is changed or cleaning processing is switched.

FIG. 7 is a diagram showing an example of a screen displayed on the operation section of the analysis server. FIG. 7 shows the maintenance information screen 700 of the image forming apparatus 101, which is displayed based on log information received by the analysis server 104 from the image forming apparatus 101, by way of example. The maintenance information screen 700 has a device information area 701 for displaying the device information of the image forming apparatus 101 as the maintenance target and a component list area 702 for indicating a list of consumable components of the image forming apparatus 101. The device information area 701 displays a device ID, a product name, and a last update date on which information was received from the device last time, based on the information received from the image forming apparatus 101. In the component list area 702, out of the consumable components of the image forming apparatus 101 as the maintenance target, a component required to be replaced, a component which is to be required to be replaced soon, and a component which has been automatically ordered, are displayed in a list. In this component list, a consumable component name, the number of remaining usable days for each consumable component as a result of analysis on the information (history information) received by the data analysis section 525, description of a replacement state of the consumable component, and a date on which the consumable component was replaced last time are displayed. The replacement state is determined by comparing the number of remaining days calculated by the data analysis section 525 and a threshold value. For example, when the number of remaining days is less than 30 days, it is determined that it is necessary to replace the component soon, or when the number of remaining days is less than 15 days, it is determined that it is necessary to replace the component. Further, when the number of remaining days reaches the number of days obtained by adding the number of days required to get a new consumable component to the number of remaining days during which replacement is required, the consumable component to be replaced may be automatically ordered. For example, in a case where five days are required until the consumable component arrive after the ordering, when the number of remaining days becomes less than 20 days, the consumable component may be automatically ordered. Further, in a case where the consumable component is automatically ordered, "automatically ordered" is displayed in the description of the replacement state.

Figure 8A:
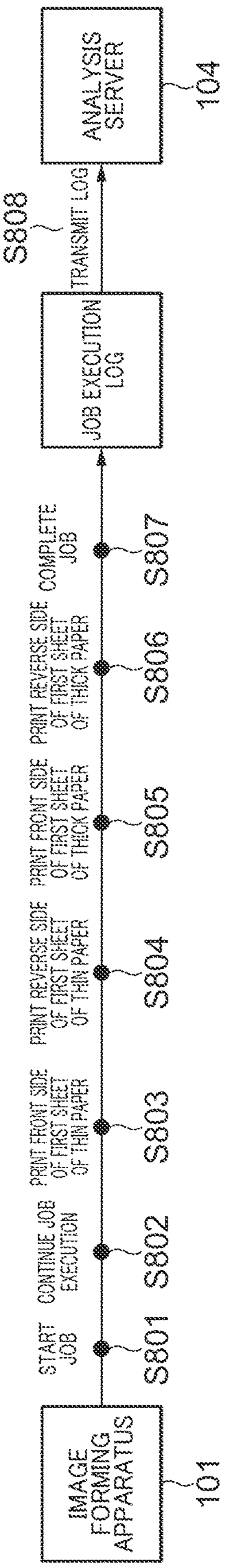
FIGS. 8A to 8C are diagrams each showing a flow of a process for transmitting a log from the image forming apparatus to the analysis server.
Figure 8B:
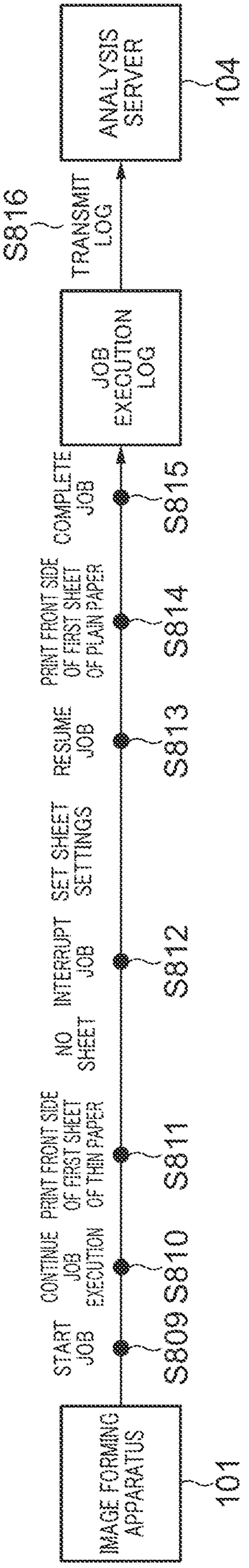
Figure 8C:
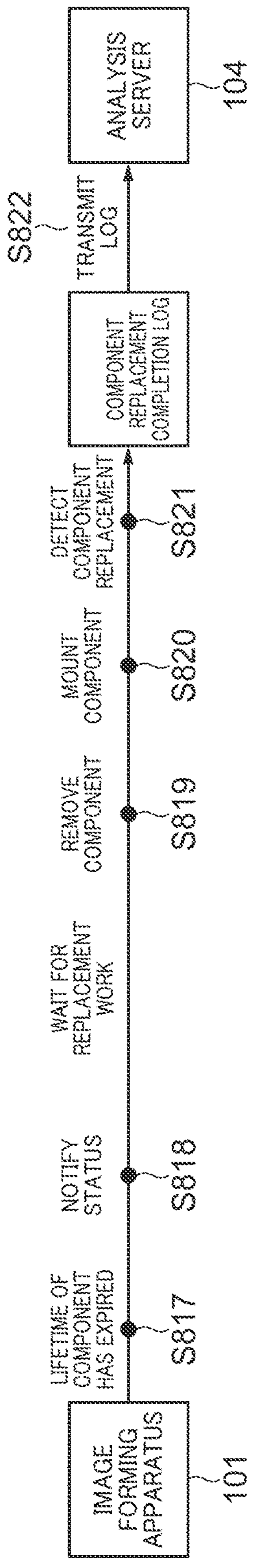

Next, a description will be given of a flow of a process in which the image forming apparatus 101 transmits log information to the analysis server 104. FIGS. 8A and 8B each show a flow of the process for executing a mixed-sheet print job and transmitting a job execution log (history information), and FIG. 8C shows a flow of transmitting log information indicating that a consumable component of the image forming apparatus 101 has been replaced.

Referring to FIG. 8A, a case of the print job will be described where the mixed-sheet print job for performing printing on a plurality of types of sheets is started, the sheets are switched in the middle of the print job, and the printing continues to be performed on the changed sheet. Note that FIG. 8A shows an example in which printing is sequentially performed on an A4-size sheet of thin paper and an A4-size sheet of thick paper.

As shown in FIG. 8A, the image forming apparatus 101 starts the above-mentioned print job, execution of which has been instructed from the user (step S801). When the print job is started, the job management section 505 sends a job status notification indicating the start of the job to the transmission data generation section 511. The transmission data generation section 511 having received this job status notification starts a job execution log generation process. In the job execution log generation process, the transmission data generation section 511 acquires sheet information of each sheet feed cassette at the start of the print job. Then, the transmission data generation section 511 acquires the sheet brand information items associated with the respective sheet brand IDs included in the acquired sheet information items, from the sheet brand table 517. For example, in a case where the sheet information items of the sheet feed cassettes 1 to 3 are acquired from the sheet feed cassette information table 515, the transmission data generation section 511 acquires the sheet brand information items respectively associated with "00000100", "00000101", and "00010104" from the sheet brand table 517.

Then, the job management section 505 continues execution of the print job (step S802) and sends a job status notification indicating the in-execution status of the job to the transmission data generation section 511. The transmission data generation section 511 having received this job status notification does not perform processing. The job management section 505 starts execution of the print job, sends an instruction for printing the first page to the printer controller 509, and sends the same to the transmission data generation section 511 at the same time. The transmission data generation section 511 having received this print instruction notification causes the print order information management section 513 to record contents of the print instruction specifying the sheet feed cassette 3, monochrome printing, and the front side, in the print order information table. Then, the printer controller 509 feeds an A4-size sheet of thin paper from the sheet feeding tray 415 corresponding to the sheet feed cassette 3 and controls the printer engine 411 to perform printing on the front side of this sheet (step S803).

Then, the job management section 505 sends an instruction for printing the second page to the printer controller 509 and the transmission data generation section 511. The transmission data generation section 511 causes the print order information management section 513 to record contents of the print instruction specifying the sheet feed cassette 3, monochrome printing, and the reverse side, in the print order information table. Then, the printer controller 509 inverts the sheet fed from the sheet feed cassette 3 within the printer engine 411 and controls the printer engine 411 to perform printing on the reverse side (step S804).

Then, the job management section 505 sends an instruction for printing the third and fourth pages to the printer controller 509 and the transmission data generation section 511. The transmission data generation section 511 causes the print order information management section 513 to record the sheet feed cassette 2, monochrome printing, and the front side, in the print order information table, and then record the sheet feed cassette 2, monochrome printing, and the reverse side, in the print order information table. Then, the printer controller 509 determines whether or not to switch the print control based on the mixed-sheet print mode switching setting. If it is determined that the print control is to be switched, the printer controller 509 feeds a sheet from the sheet feed cassette 2 and controls the printer engine 411 to perform printing on the front side of this sheet (step S805). After that, the printer controller 509 inverts the sheet within the printer engine 411 and controls the printer engine 411 to perform printing on the reverse side (step S806). Then, when execution of the print job is completed (step S807), the job management section 505 sends a job status notification indicating the end of the job to the transmission data generation section 511. The transmission data generation section 511 having received this job status notification acquires the history information of the print job, execution of which is completed, from the job history management section 512. The transmission data generation section 511 generates a job execution log based on the history information of the print job. Then, the image forming apparatus 101 transmits the job execution log generated by the transmission data generation section 511 to the analysis server 104 via the interface section 501 (step S808), followed by terminating the present process.

As described above, the image forming apparatus 101 can execute a series of the print job, including a first step for performing printing on a sheet having a first attribute and a second step for performing printing on a sheet having a second attribute which is different from the first attribute after the first step. Here, in the example shown in FIG. 8A, "the sheet having the first attribute" refers to the thin paper, and "the sheet having the second attribute" refers to the thick paper. Therefore, the difference between the first attribute and the second attribute is a difference in thickness of the sheet. Then, the printer controller 509 performs printing on the sheets which are different in thickness in the first step (steps S803 and S804) and the second step (steps S805 and S806). Further, the job history management section 512 records the history information of the print job, execution of which is completed, in the job history information table. This history information includes history information which enables identification of the switching timing between the first step and the second step and is transmitted to the analysis server 104 via the interface section 501 (step S808). As described above, the data analysis section 525 of the analysis server 104 can identify the switching timing of the print operation based on the history information which enables identification of the switching timing. This switching timing can be regarded as equivalent to a value of the number of times of switching, and it is expected that the length of the lifetime of the consumable component is influenced by the magnitude of the number of times of switching. The data analysis section 525 of the analysis server 104 determines the lifetime of the consumable component based on the switching timing. A determination result on the lifetime is notified from the analysis server 104 to the image forming apparatus 101 via the interface section 501. The determination result on the lifetime is displayed on the console section 406 of the image forming apparatus 101. This enables the user to grasp the remaining days on which the consumable component can be used.

Further, in the present embodiment, as the difference between the first attribute and the second attribute, the front side and the reverse side of the sheet may be included. In this case, the printer controller 509 performs printing on the front side of the sheet in one of the first step and the second step and performs printing on the reverse side of the sheet in the other step. Note that in the example shown in FIG. 8A, the one step is the first step (steps S803 and S805) and the other step is the second step (steps S804 and S806). Then, similarly, in this case, the history information which enables identification of the switching timing between the first step and the second step is transmitted to the analysis server 104 via the interface section 501. After this transmission, the data analysis section 525 of the analysis server 104 can identify the switching timing to use the same for determining the lifetime of the consumable component.

Further, as described above, in the image forming apparatus 101, the image quality priority button 631 and the productivity priority button 632 are selectable. The image quality priority button 631 and the productivity priority button 632 function as condition changing means that can change the condition for forming an image in the first step and the second step. With this, it is possible to switch whether to perform high-image quality printing by attaching importance to the image quality or perform high-speed printing by attaching importance to the print speed, by a simple operation of selecting one of the image quality priority button 631 and the productivity priority button 632.

Referring to FIG. 8B, a case will be described where for a mixed-sheet print job for performing printing on a plurality of types of sheets, a sheet which is not currently set in the sheet feed cassette is designated. In the example shown FIG. 8B, as the operation of the print job, the print job is started but temporarily stopped because no sheets are set. After that, the user sets sheets on the manual feeding tray 412, and then the print job is resumed. Further, FIG. 8B shows an example in which printing is performed on an A4-size sheet of thin paper, and then performed on an A3-size sheet of plain paper.

As shown in FIG. 8B, the image forming apparatus 101 starts the above-mentioned print job, execution of which has been instructed by the user (step S809). When the print job is started, the job management section 505 sends a job status notification indicating the start of the job to the transmission data generation section 511. Similar to FIG. 8A, the transmission data generation section 511 having received this job status notification starts the job execution log generation process. With this process, for example, in a case where the transmission data generation section 511 acquires sheet information items of the sheet feed cassettes 1 to 3 from the sheet feed cassette information table 515, the transmission data generation section 511 acquires the sheet brand information items associated with the respective sheet brand IDs included in the acquired sheet information items, from the sheet brand table 517.

Then, the job management section 505 continues execution of the print job (step S810) and sends a job status notification indicating the in-execution status of the job to the transmission data generation section 511. The transmission data generation section 511 having received this job status notification does not perform processing. The job management section 505 starts execution of the print job, sends an instruction for printing the first page to the printer controller 509, and sends the same to the transmission data generation section 511 at the same time. The transmission data generation section 511 having received this print instruction notification causes the print order information management section 513 to record contents of the print instruction specifying the sheet feed cassette 3, color printing, and the front side, in the print order information table. Then, the printer controller 509 feeds an A4-size sheet of thin paper from the sheet feeding tray 415 corresponding to the sheet feed cassette 3 and controls the printer engine 411 to perform printing on the front side of this sheet (step S811).

Then, the job management section 505 controls the sheet feed cassette management section 514 to detect presence/absence of a sheet feed cassette in which A3-size sheets of plain paper are set. In a case where it is detected that the sheet feed cassette in question does not exist, the sheet feed cassette management section 514 notifies the job management section 505 of this fact. The job management section 505 having received this notification performs processing for interrupting the print job (step S812) and sends a job status notification indicating interruption of the job to the transmission data generation section 511. At this time, the job management section 505 may control the operation controller 503 to display a message to the effect that absence of A3-size sheets of plain paper has occurred. Here, for example, it is assumed that the user sets one A3-size sheet of plain paper on the manual feeding tray 412 and sets the sheet information corresponding to this sheet in association with the manual feeding tray 412. In a case where it is detected that a sheet has been set on the manual feeding tray 412 and the sheet information has been set, the job management section 505 resumes the print job (step S813) and sends a job status notification indicating the resumption of the job to the transmission data generation section 511. The transmission data generation section 511 having received this job status notification acquires the sheet information of the manual feeding tray 412 on which the user has set the sheet during interruption of the print job. Then, the transmission data generation section 511 acquires the sheet brand information associated with the sheet brand ID included in this acquired sheet information. The job management section 505 resumes the print job, sends an instruction for printing the second page to the printer controller 509, and sends the same to the transmission data generation section 511 at the same time. The transmission data generation section 511 having received this print instruction notification causes the print order information management section 513 to record contents of the print instruction specifying the manual feeding tray, color printing, and the front side, in the print order information table. Then, the printer controller 509 determines whether or not to switch the print control based on the sheet mixing print mode switching setting. If it is determined that the print control is to be switched, the printer controller 509 feeds the A3-size sheet of plain paper from the manual feeding tray 412 and controls the printer engine 411 to perform printing on the front side of this sheet (step S814). After that, when execution of the print job is completed (step S815), the job management section 505 sends a job status notification indicating the end of the job to the transmission data generation section 511. At this time, in the present embodiment, for example, it is assumed that the set sheet is not left on the manual feeding tray 412. In this case, when no sheet is left on the manual feeding tray 412, the setting of the sheet information of the manual feeding tray 412 is released, and the sheet information of the manual feeding tray 412 is changed to the unset state. The transmission data generation section 511 having received this job status notification acquires the history information of the print job, execution of which is completed, from the job history management section 512. The transmission data generation section 511 generates a job execution log based on the history information of the print job and the sheet attribute information of the manual feeding tray 412, which was acquired when the print job was resumed. This job execution log includes the history information indicating the execution result of the print job and the sheet attribute information of the manual feeding tray 412 which was set when the A3-size sheet of plain paper was set on the manual feeding tray 412. Then, the image forming apparatus 101 transmits the job execution log generated by the transmission data generation section 511 to the analysis server 104 via the interface section 501 (step S816), followed by terminating the present process.

As described above, in the example shown in FIG. 8B, "the sheet having the first attribute" refers to the A4-size sheet and "the sheet having the second attribute" refers to the A3-size sheet. Therefore, the difference between the first attribute and the second attribute is a difference in size of the sheet, and the printer controller 509 performs printing on the sheets which are different in size in the first step (step S811) and the second step (step S814) as the print job. Then, the history information of the print job for performing printing on sheets which are different in size is recorded in the job history management section 512. Similar to the example shown in FIG. 8A, this history information includes the history information which enables identification of the switching timing between the first step and the second step and is transmitted to the analysis server 104 (step S816). The data analysis section 525 of the analysis server 104 can identify the switching timing of the print operation based on the history information which enables identification of the switching timing, and determine the lifetime of the consumable component.

Further, in the example shown in FIG. 8B, the print job is temporarily interrupted between the first step and the second step (step S812). The information on this interruption is sent from the job management section 505 to the job history management section 512 via the transmission data generation section 511. With this, the job history management section 512 can acquire the information on interruption as part of the history information transmitted to the analysis server 104. As a result, for example, the data analysis section 525 of the analysis server 104 can also use the information on interruption included in the history information for determination of the lifetime of the consumable component.

A flow of a process from expiration of the lifetime of a consumable component, via completion of replacement of the consumable component, to transmission of a component replacement completion log will be described with reference to FIG. 8C.

Referring to FIG. 8C, the image forming apparatus 101 detects that the job is completed, and as a result, the lifetime of a consumable component has expired (step S817). Note that this detection may be performed based on the determination result on the lifetime of the consumable component, which has been transmitted from the data analysis section 525 of the analysis server 104. When it is detected that the lifetime of the consumable component has expired, the image forming apparatus 101 notifies the console section 406 of this fact (step S818). This enables the user to grasp that it is necessary to replace the consumable component.

In the image forming apparatus 101, whether or not a job is executable is different depending on a consumable component of which the lifetime has expired. In a case where the job is executable, the image forming apparatus 101 notifies the user of a status indicating "expiration of consumable component lifetime" and waits for replacement of the consumable component while waiting for a job. On the other hand, in a case where the job is not executable, the image forming apparatus 101 displays a status notification and a fact indicating that the job cannot be executed on the console section 406 and remains on standby.

Then, the image forming apparatus 101 has component replacement performed by the user. In the component replacement, the consumable component to be replaced is removed (step S819), and then a new consumable component is mounted (step S820). After mounting the component, the user operates the console section 406 to notify the image forming apparatus 101 of completion of replacement of the consumable component. With this, in the image forming apparatus 101, it is determined that the replacement of the component is completed (step S821).

Further, in a case where the consumable component of which the lifetime has expired is replaced, the information on this replacement is notified to the analysis server 104 via the interface section 501. More specifically, the transmission data generation section 511 generates a component replacement completion log based on the fact that replacement of the component is completed and transmits the generated log to the analysis server 104 via the interface section 501 (step S822). With this, the analysis server 104 acquires the component replacement completion log via the data acquisition section 520 and updates the lifetime calculation logic of the replaced consumable component as described hereinabove.

Figure 9:
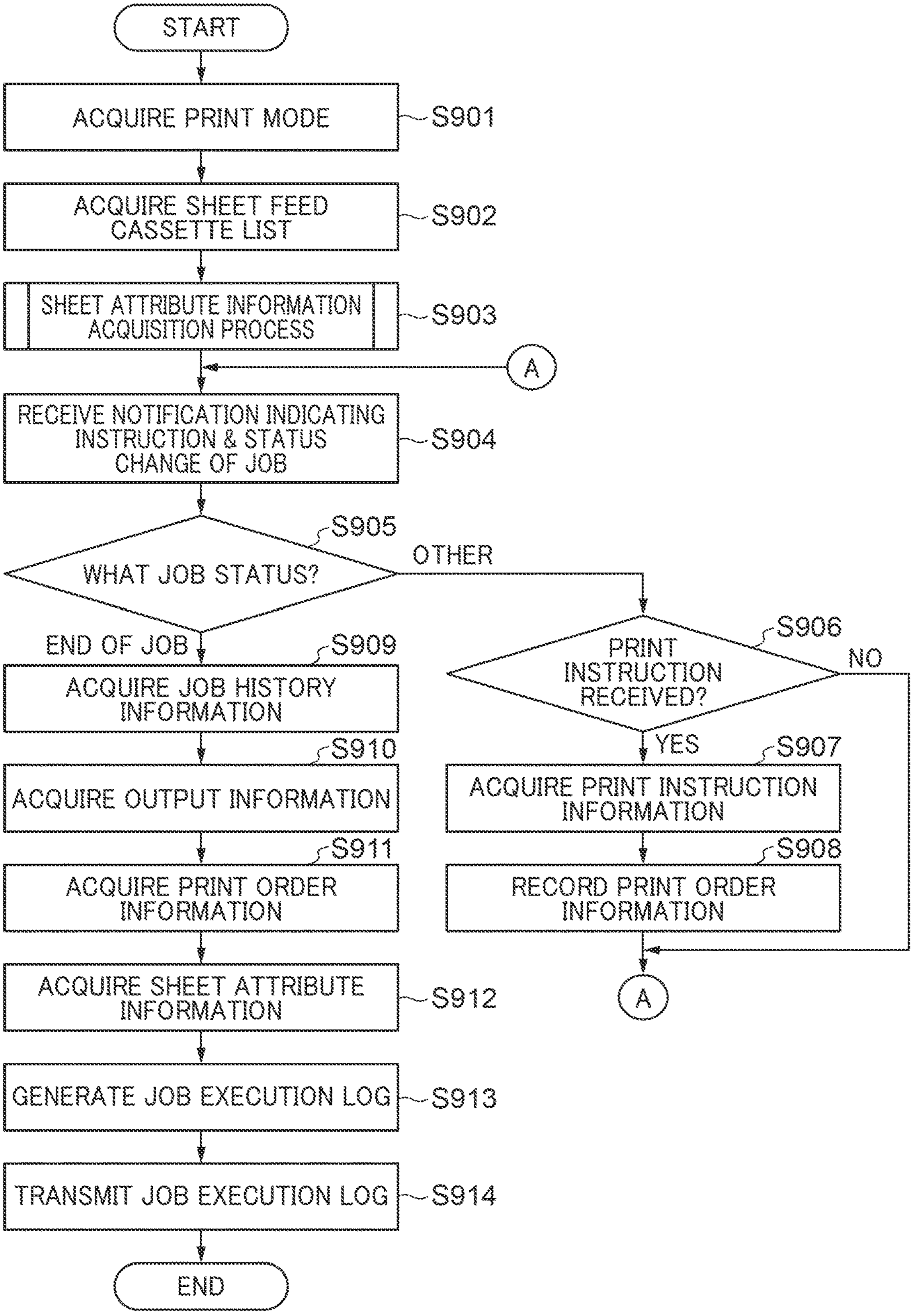
FIG. 9 is a flowchart of a job execution log generation process performed by the image forming apparatus according to a first embodiment.

FIG. 9 is a flowchart of the job execution log generation process performed by the image forming apparatus according to a first embodiment. This job execution log generation process is realized by a control program loaded by the CPU 401 from the ROM 403 into the RAM 402 and is executed by the transmission data generation section 511. Further, the job execution log generation process is executed when the image forming apparatus 101 receives the above-mentioned print job and an instruction for executing the print job from the user, whereby the transmission data generation section 511 receives a job status notification indicating the start of the job.

As shown in FIG. 9, the transmission data generation section 511 acquires the print mode setting from the print setting management section 510 via the job management section 505 (step S901). This print mode is stored in the RAM 402. Then, the transmission data generation section 511 acquires the sheet feed cassette list which is the list information of the sheet feed cassettes included in the printer engine 411 from the printer controller 509 via the job management section 505 (step S902). This sheet feed cassette list is stored in the RAM 402.

Figure 10:
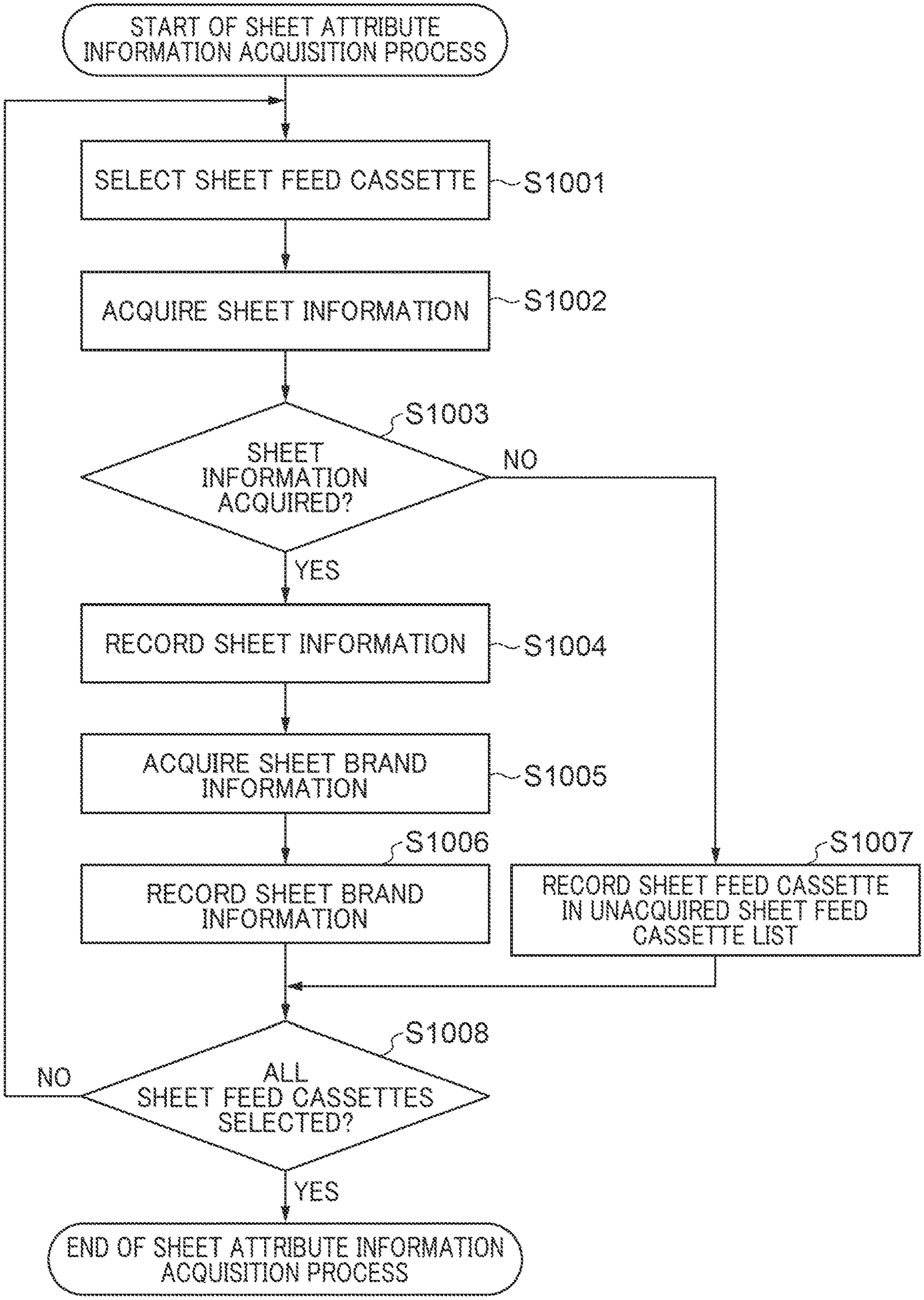
FIG. 10 is a flowchart of a sheet attribute information acquisition process.

Then, the transmission data generation section 511 executes a sheet attribute information acquisition process shown in FIG. 10 (step S903). This sheet attribute information acquisition process will be described hereinafter. After execution of the step S903, the transmission data generation section 511 waits for reception of a notification indicating a status change of the job, more specifically, a job status notification indicating an event other than the start of the job from the job management section 505. In a case where a job status notification indicating an event other than the start of the job is received from the job management section 505 (step S904), the transmission data generation section 511 determines the status of the job indicated by this job status notification (step S905). More specifically, the transmission data generation section 511 determines whether the received job status notification is a notification indicating the end of the job or a notification indicating an event other than the start of the job and the end of the job (hereinafter referred to as the "other notification"). Examples of the case where the job status notification received in the step S904 indicates the end of the job include a case where the job is completed, a case where the user has intentionally terminated execution of the job, and a case where an error has occurred in some processing in the job and the job has been terminated.

If it is determined in the step S905 that the job status notification received in the step S904 is the other notification, the transmission data generation section 511 determines whether the received job status notification is a print instruction (step S906). If it is determined in the step S906 that the received job status notification is not a print instruction, the job execution log generation process returns to the step S904. Further, if it is determined in the step S906 that the received job status notification indicates a print instruction, the transmission data generation section 511 acquires print instruction information from the job management section 505 (step S907). The print instruction information acquired at this time includes information on a sheet feed cassette, a color mode, and a printing side. Further, the print instruction information further includes information on a temperature and a humidity of the printer engine 411 (image forming section 4111) at the time of instructing the printing, which have been acquired via the printer controller 509. As described above, the temperature and humidity of the printer engine 411 are detected by the environment sensor 420. This information on the temperature and humidity (information on the environmental condition) is acquired as part of the history information and can be used for determination of the lifetime of the consumable component.

Then, the transmission data generation section 511 records the received print instruction information as the print order information via the print order information management section 513 (step S908). Then, the job execution log generation process returns to the step S904.

If it is determined in the step S905 that the received job status notification indicates the end of the job, the transmission data generation section 511 acquires the history information of the job, execution of which has been terminated (step S909). This job history information includes the information which enables identification of the switching timing between the first step and the second step and is temporarily stored in the RAM 402. Then, the transmission data generation section 511 acquires output information from the above-mentioned history information of the job (step S910) and temporarily stores the output information in the RAM 402. This output information includes information for identifying a sheet feed cassette which has fed the sheet in the job. Note that in a case where the output information includes information on a plurality of sheet feed cassettes, the transmission data generation section 511 reads the information on all of these sheet feed cassettes and temporarily stores the read information in the RAM 402.

Then, the transmission data generation section 511 acquires the print order information from the job management section 505 (step S911) and temporarily stores the acquired print order information in the RAM 402. This print order information includes the information for identifying all of the print information items of the print job. The transmission data generation section 511 reads all of these print order information items and temporarily stores the read information in the RAM 402.

Then, the transmission data generation section 511 acquires the sheet attribute information associated with the sheet feed cassette identified from the output information acquired in the step S910, from the sheet feed cassette sheet information list (step S912). Here, in a case where information on a plurality of sheet feed cassettes is included in the acquired output information in the step S910, the transmission data generation section 511 acquires the sheet attribute information items associated with all of these sheet feed cassettes. The transmission data generation section 511 holds the acquired sheet attribute information in the RAM 402. Then, the transmission data generation section 511 generates a job execution log 1200 shown in FIG. 12 based on the history information of the job and the sheet attribute information acquired in the step S912 (step S913) and records this job execution log 1200 in the HDD 404. Then, the transmission data generation section 511 transmits the generated job execution log 1200 to the analysis server 104 (step S914), followed by terminating the job execution log generation process.

Note that although the job execution log generation process shown in FIG. 9 is the process for immediately transmitting the generated job execution log 1200 to the analysis server 104, this is not limitative. For example, the job execution log generation process may be configured such that the job execution log 1200 is held in the HDD 404 and transmitted to the analysis server 104 collectively together with job execution logs of other jobs.

FIG. 10 is a flowchart of the sheet attribute information acquisition process. The sheet attribute information acquisition process is executed in the step S903.

As shown in FIG. 10, the transmission data generation section 511 selects one sheet feed cassette from the acquired list, such as the sheet feed cassette list (step S1001). Then, the transmission data generation section 511 acquires the sheet information set to the selected sheet feed cassette from the sheet feed cassette information table 515 (step S1002). This sheet information is stored in the RAM 402. Then, the transmission data generation section 511 determines whether or not acquisition of the sheet information of the selected sheet feed cassette is successful (step S1003).

If it is determined in the step S1003 that the sheet information of the selected sheet feed cassette has been acquired, the transmission data generation section 511 records the acquired sheet information in the sheet feed cassette sheet information list (step S1004). The sheet feed cassette sheet information list is used for generating the job execution log 1200, described hereinafter, and is stored in the RAM 402. Then, the transmission data generation section 511 acquires (extracts) a sheet brand ID from the sheet information acquired in the step S1002. The transmission data generation section 511 requests, via the job management section 505, the sheet brand information management section 516 to provide the sheet brand information associated with the acquired sheet brand ID. Then, the transmission data generation section 511 acquires the corresponding sheet brand information registered in the sheet brand table 517 from the sheet brand information management section 516 (step S1005). Then, the transmission data generation section 511 records the acquired sheet brand information in the sheet feed cassette sheet information list in association with the sheet information recorded in the step S1004 (step S1006). Then, the sheet attribute information acquisition process proceeds to a step S1008.

If it is determined in the step S1003 that acquisition of the sheet information of the selected sheet feed cassette has failed, the transmission data generation section 511 records the sheet feed cassette selected in the step S1002 in a sheet information-unacquired sheet feed cassette list (step S1007). Then, the transmission data generation section 511 determines whether or not all of the sheet feed cassettes in the acquired list have been selected in the step S1001 (step S1008).

If it is determined in the step S1008 that there is a sheet feed cassette in the acquired list, which has not been selected, the sheet attribute information acquisition process returns to the step S1001. Then, the transmission data generation section 511 selects one of the unselected sheet feed cassettes in the acquired list and executes the step S1002 et seq. Further, if it is determined in the step S1008 that all of the sheet feed cassettes in the acquired list have been selected, the sheet attribute information acquisition process is terminated and the process proceeds to the step S904 in FIG. 9.

Figure 11:
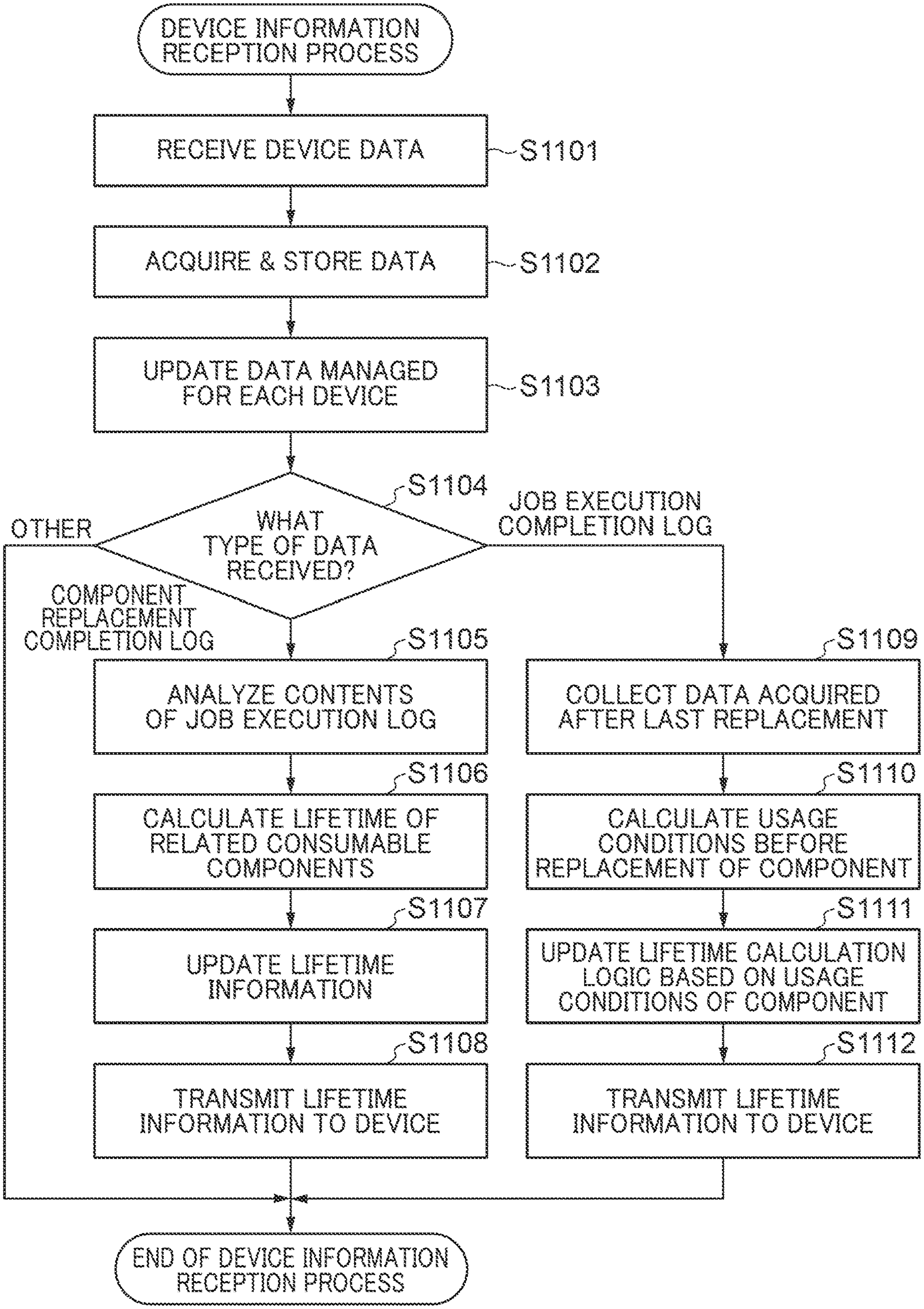
FIG. 11 is a flowchart of a process performed by the analysis server after receiving log information.

FIG. 11 is a flowchart of a process performed by the analysis server after receiving log information. This process is a device information reception process performed by the analysis server 104 when the network communication section 519 receives log information from the image forming apparatus 101. The device information reception process is realized by a control program loaded by the CPU 422 from the ROM 424 into the RAM 423.

As shown in FIG. 11, the network communication section 519 receives log information (device data) from the image forming apparatus 101 via the network 102 (step S1101). This log information is stored in the RAM 423. Then, the data acquisition section 520 receives a notification that the log information has been acquired, from the network communication section 519. Further, the data acquisition section 520 acquires the log information from the RAM 423 and the data storing section 521 stores the log information in the HDD 425 (step S1102). Then, the data acquisition section 520 notifies the device data management section 522 that the log information has been stored. The device data management section 522 reads the log information stored in the HDD 425, aggregates the log information as the information of each image forming apparatus 101, and the device data-storing section 523 records the aggregated information in the HDD 425 (step S1103).

Then, the device data management section 522 notifies the data analysis section 525 that the log information has been received and the device data has been updated. The data analysis section 525 determines which of the job execution completion log information, the component replacement completion log information, and the other log information, the type of the received log information is (step S1104).

If it is determined in the step S1104 that the type of the received log information is the job execution completion log information, the data analysis section 525 analyzes the job execution information recorded in the received job execution completion log information (step S1105). More specifically, the data analysis section 525 calculates the number of times of switching sheets for printing (switching timing), and so forth, which has influence on the calculation of the lifetime of the consumable component, from the job execution information of the job execution completion log. Then, the data analysis section 525 calculates the lifetime of each of influenced consumable components based on the information obtained by the analysis in the step S1105 (step S1106). For example, in the case of calculation of the lifetime of the fixing roller which is a consumable component influenced by adjustment of the fixing temperature, the lifetime is calculated based not only on the number of prints for each print size, but also based on the number of times of switching the fixing temperature during the job. Then, the data analysis section 525 updates the lifetime information stored in the RAM 423 or the HDD 425 by the lifetime information-storing section 526 using the calculated lifetime information (step S1107). As the lifetime information to be stored, for example, a result of the calculation in the step S1106 is recorded in a form of the number of remaining usable days of the consumable component. Then, the data analysis section 525 transmits, via the network communication section 519, the lifetime information as the calculation result to the image forming apparatus 101 which is the log information transmission source (step S1108), followed by terminating the process in FIG. 11.

If it is determined in the step S1104 that the type of the received log is the component replacement completion log, the data analysis section 525 identifies a component recorded in the received component replacement completion log. Then, the data analysis section 525 collects data of the identified component, which has been acquired after the last replacement, via the device data management section 522 (step S1109). The data collected in this step also includes information calculated from the job execution completion log which influences calculation of the lifetime. Then, the data analysis section 525 calculates the usage conditions from the last time that the component was replaced to this time that the component has been replaced, based on the data collected in the step S1109 (step S1110). The usage conditions calculated in this step refer to the number of printed sheets for each set of a sheet size and sheet attributes, the number of times of switching the fixing temperature when a mixed-sheet job is executed, and so forth. Then, the data analysis section 525 updates the lifetime calculation logic based on the usage conditions of the component calculated in the step S1110 (step S1111). The lifetime calculation logic refers to, for example, a formula in which the usage conditions are used as parameters for each consumable component and each parameter is assigned with a weight. Further, the update of the lifetime calculation logic can refer to a change of the weight of the formula based on the usage conditions recorded until the consumable component is actually replaced. In a case where the lifetime calculation logic is updated, the data analysis section 525 performs the lifetime calculation again and the lifetime information-storing section 526 stores the lifetime information in the RAM 423 and the HDD 425. Then, the data analysis section 525 transmits the lifetime information which is the calculation result to the image forming apparatus 101 which is the log transmission source via the network communication section 519 (step S1112), followed by terminating the process in FIG. 11.

If it is determined in the step S1104 that the type of the received log information is the other log information, the process in FIG. 11 is terminated without performing the process in the data analysis section 525.

Although in the process in FIG. 11, the analysis server 104 immediately performs the process upon receipt of one log information item, this is not limitative. For example, in a case where a plurality of log information items are collectively transmitted from the image forming apparatus 101 to the analysis server 104, the analysis server 104 may collectively receive these log information items and execute the process on the collective log information items one by one. Further, when updating the lifetime calculation logic in the step S1111, the data analysis section 525 may update the logic using not only the usage condition information obtained after the last replacement of the component, but also the usage condition information obtained before the last replacement of the component and the component replacement information of other devices. Further, as a result of the update of the lifetime calculation logic in the step S1112, the data analysis section 525 may recalculate the lifetime for the other image forming apparatus 101 using the same consumable component and transmit a result of the recalculation.

FIG. 12A is a diagram showing an example of the job execution log generated by the transmission data generation section. The job execution log 1200 shown in FIG. 12A is data of a JSON format, generated by outputting one file as one log. The job execution log 1200 is formed by basic information 1201, print setting information 1202, output information 1203, print order information 1204, and sheet attribute information 1205.

In the basic information 1201, values of the basic information in the history information of the job are set. In the print setting information 1202, values of the print setting information in the history information of the job are set. The output information 1203 is formed by a paper attribute, a page attribute, and an outputPaper attribute. As the information on the paper attribute, for example, the total number of output sheets in the history information of the job is set. As the information on the page attribute, for example, the number of pages in the history information of the job is set. As the information on the outputPaper attribute, the number of color-printed sheets of a sheet feed cassette or the number of monochrome-printed sheets of a sheet feed cassette is set. Note that in a case where the information items of a plurality of sheet feed cassettes are set in the outputPaper attribute, from a line next to the last line of the information on one sheet feed cassette, the information on another sheet feed cassette is added. The print order information 1204 has values of the print order information acquired in the step S911, set therein, and is comprised of a printOrder attribute, a trayAlias attribute, a colorMode attribute, and a paperSide attribute. As the printOrder attribute, for example, the print order information acquired from the print order information table is set in the printing order for each printed page. As the trayAlias attribute, the sheet feed cassette information for identifying a sheet feed cassette which has fed a sheet to be printed is set. Further, as the colorMode attribute, the color mode information indicating whether contents of a page are printed in monochrome or in color is set. Further, as the paperSide attribute, sheet side information for specifying whether a page is printed on a front side or a reverse side of a sheet is set. The sheet attribute information 1205 has values of the sheet attribute information acquired in the step S909, set therein, and is formed comprised of a size attribute, a type attribute, and so forth. As the information on the size attribute in the sheet attribute information 1205, for example, the sheet information acquired from the sheet feed cassette information table 515 is set. Further, as the information on the type attribute and following information, for example, the sheet brand information acquired from the sheet brand table 517 is set. In a case where information items of a plurality of sheet feed cassettes are set in the sheet attribute information 1205 as well, from a line next to the last line of the information on one sheet feed cassette, the information on another sheet feed cassette is added.

Figure 12B:
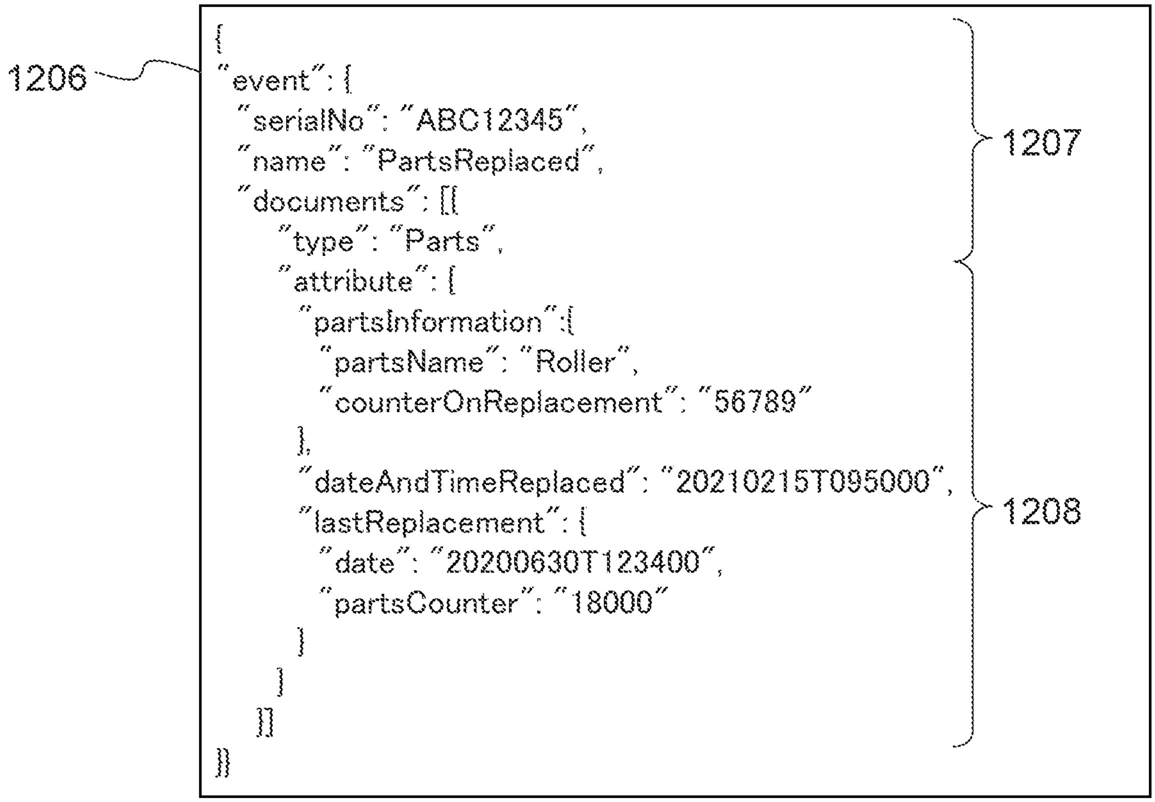

FIG. 12B is a diagram showing an example of the component replacement completion log generated by the transmission data generation section. The component replacement completion log, denoted by reference numeral 1206, shown in FIG. 12B is data of the JSON format, generated by outputting one file as one log. The component replacement completion log 1206 is formed by basic information 1207 and replaced component information 1208.

In the basic information 1207, the basic information of the image forming apparatus 101 in which the component has been replaced and a classification of a log are described. The replaced component information 1208 is formed by information on the replaced consumable component, counter information of the component up to replacement of the component, replacement completed date and time, date and time of the last replacement, and component counter information. As the information on the replaced consumable component, for example, a consumable component name is described in a partsName attribute, a counter value at the time of replacement of the component is described in a counterOnReplacement attribute, and date and time on which the replacement was completed is described in a dateAndTimeReplaced attribute. Further, as for the date and time of the last replacement and the component counter information, for example, the last replacement date and time is indicated in a date attribute of a lastReplacement attribute, and a component counter value at the time of last replacement is indicated in a partsCounter attribute. In a case where a plurality of components have been replaced, the component replacement completion log may be transmitted for each component. In a case where completion of replacement of the plurality of components is simultaneously detected, the information on the plurality of components may be included by describing the plurality of replaced component information items 1208 in one component replacement completion log.

Note that the job execution log 1200 is not limited to the data of the JSON format, which was delivered as one file as one log, but for example, the job execution log 1200 may be generated as tabular format data having one job execution log as one row. Further, although in the present embodiment, the information at the time of execution of the job is recorded in the job execution log 1200, the other log may be recorded and transmitted to the analysis server 104. For example, when the printer engine 411 switches the sheet to be printed, if the print control is switched according to the sheet attribute information of the switched sheet, a print control switching log may be recorded and transmitted to the analysis server 104.

Further, in the present embodiment, whenever the printer controller 509 instructs printing, a sheet feed cassette to feed a sheet to be printed, a color mode, and a printing side are acquired as the print order information based on this print instruction. With this, it is possible to record and transmit the print order information of each page for analyzing the contents of the print control set when the printer engine 411 prints each page, in the printing order, as the job execution log.

Further, in the present embodiment, whenever the printer controller 509 instructs printing, not only the print order information based on this print instruction, but also environmental information acquired by the printer engine 411 when the print instruction is provided, i.e. the temperature and humidity around the printer engine 411 are acquired. With this, it is possible to record and transmit the environmental information at the time of printing each page, for analyzing the contents of the print control, as the job execution log while taking into consideration the environmental information for the printer engine 411 to perform the print control.

Further, in the present embodiment, the print job status of the image forming apparatus 101 is analyzed by the analysis server 104 based on the log information received from the image forming apparatus 101. With this, it is possible to calculate the lifetime of the consumable component of the image forming apparatus 101 while taking into consideration not only the number of use times, but also a type of the image forming control (such as the switching timing) and the fixing control.

Further, as the function of executing a print job, there can be used, for example, not only the copy function, but also the print function responsive to a print request received from the communication apparatus 103 and the print function responsive to FAX reception.

Next, a description will be given of a second embodiment of the present invention with reference to FIGS. 13 and 14.

Figure 13:
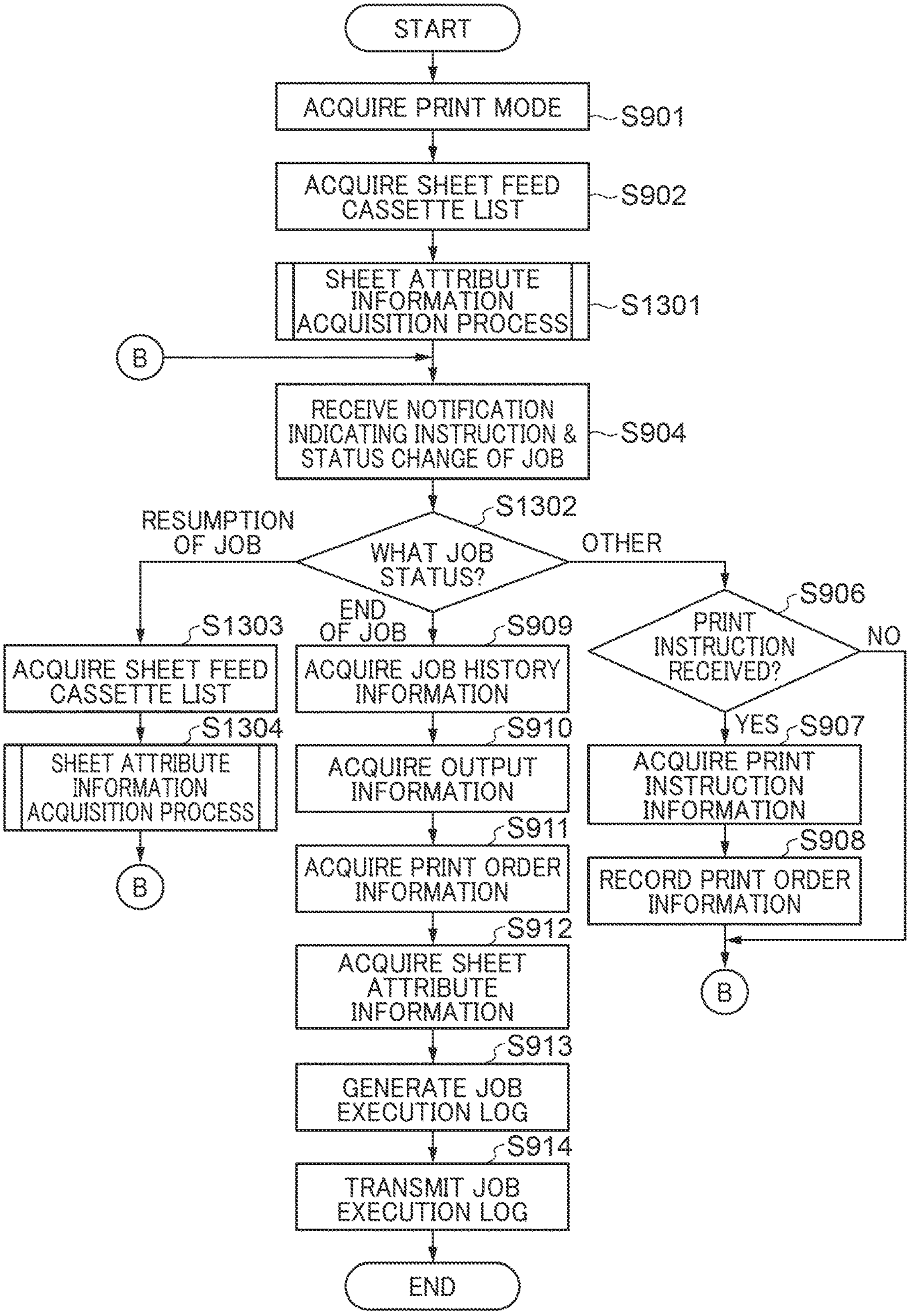
FIG. 13 is a flowchart of a job execution log generation process performed by an image forming apparatus according to a second embodiment.

FIG. 13 is a flowchart of a job execution log generation process performed by the image forming apparatus according to the second embodiment. Similar to the job execution log generation process in FIG. 9, the job execution log generation process in FIG. 13 is realized by a control program loaded by the CPU 401 from the ROM 403 into the RAM 402. Further, the job execution log generation process in FIG. 13 is also executed when the image forming apparatus 101 receives the above-described print job and the instruction for executing the print job, and so forth from the user, and the transmission data generation section 511 receives a job status notification indicating the start of the job. In the following description, the same processing as that in the job execution log generation process in FIG. 9 is denoted by the same step number, and the description is given of processing different from the job execution log generation process in FIG. 9.

Referring to FIG. 13, first, the steps S901 and S902 are sequentially executed. Then, the transmission data generation section 511 executes a sheet attribute information acquisition process in FIG. 14 (step S1301). This sheet attribute information acquisition process will be described hereinafter. After execution of the step S1301, the transmission data generation section 511 executes the step S904 and determines a status of the job indicated by the received job status notification (step S1302). More specifically, the transmission data generation section 511 determines which of a notification indicating the end of the job, a notification indicating the resumption of the job, or a notification indicating an event other than these (hereinafter referred to as the "other notification") is indicated by the received job status notification. Examples of the case where the received job status notification indicates the end of the job include a case where the job is completed, a case where the user has intentionally terminated execution of the job, and a case where an error has occurred in some processing in the job and the job has been terminated. The case where the received job status notification indicates the resumption of the job is, for example, a case where a sheet is not set in the designated sheet feeding source, the job is interrupted, then, a sheet is set in the designated sheet feeding source, and the job is resumed.

If it is determined in the step S1302 that the received job status notification indicates the resumption of the job, the transmission data generation section 511 acquires the sheet feed cassette list (step S1303). Then, the transmission data generation section 511 executes the same sheet attribute information acquisition process as the step S1301 (step S1304). By executing the process in the step S1304, in a case where the sheet attribute information set to the sheet feed cassette as the sheet feeding source of the sheet has been changed during interruption of the job, the changed sheet attribute information is recorded in the sheet feed cassette sheet information list as the sheet attribute information of the above-mentioned sheet feed cassette. Then, the job execution log generation process returns to the step S904.

If it is determined in the step S1302 that the received job status notification indicates the end of the job, the transmission data generation section 511 sequentially executes the steps S909, S910, and S911. Then, the transmission data generation section 511 acquires the sheet attribute information associated with the sheet feed cassette recorded in the output information acquired in the step S910 from the sheet feed cassette sheet information list (step S912). The transmission data generation section 511 stores the sheet attribute information acquired in the step S912 in the RAM 402. Then, the job execution log generation process proceeds to the step S913 and the step S914.

If it is determined in the step S1302 that the received job status notification indicates the other notification, the transmission data generation section 511 sequentially executes the step S906 et seq.

Figure 14:
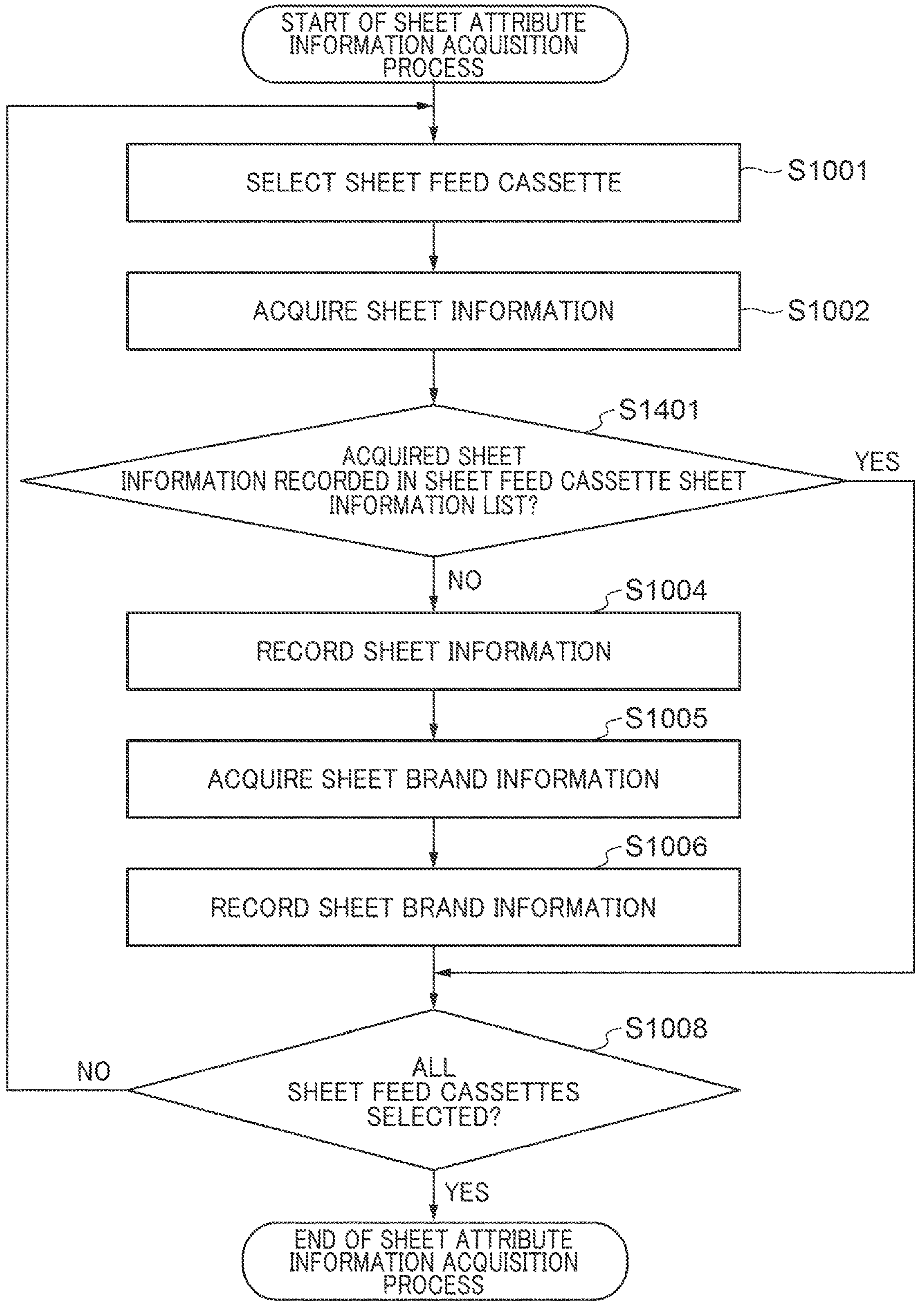
FIG. 14 is a flowchart of a sheet attribute information acquisition process.

FIG. 14 is a flowchart of the sheet attribute information acquisition process. The sheet attribute information acquisition process is executed in the step S1301 and the step S1304. In the following description, the same processing as that in the sheet attribute information acquisition process in FIG. 10 is denoted by the same step number as in FIG. 10, and the description is given of processing different from the sheet attribute information acquisition process in FIG. 10.

Referring to FIG. 14, the transmission data generation section 511 sequentially executes the steps S1001 and S1002. Then, the transmission data generation section 511 determines whether or not the sheet information acquired in the step S1002 has been recorded in the sheet feed cassette sheet information list (step S1401). For example, in a case where the information matching all of the sheet feed cassette, the sheet size, and the sheet brand ID, which are included in the acquired sheet information, has been recorded in the sheet feed cassette sheet information list, the transmission data generation section 511 determines that the acquired sheet information has been recorded in the sheet feed cassette sheet information list. On the other hand, in a case where the information matching all of the sheet feed cassette, the sheet size, and the sheet brand ID, which are included in the acquired sheet information, has not been recorded in the sheet feed cassette sheet information list, the transmission data generation section 511 determines that the acquired sheet information has not been recorded in the sheet feed cassette sheet information list.

If it is determined in the step S1401 that the acquired sheet information has been recorded in the sheet feed cassette sheet information list, the sheet attribute information acquisition process proceeds to the step S1008. On the other hand, if it is determined in the step S1401 that the acquired sheet information has not been recorded in the sheet feed cassette sheet information list, the sheet attribute information acquisition process proceeds to the step S1004. Then, after execution of the step S1004, the steps S1005, S1006, and S1008 are sequentially executed. If it is determined in the step S1008 that all of the sheet feed cassettes in the acquired list have been selected in the step S1001, the sheet attribute information acquisition process is terminated. On the other hand, if it is determined in the step S1008 that there is a sheet feed cassette in the acquired list, which has not been selected, the sheet attribute information acquisition process returns to the step S1001.

Next, a description will be given of a third embodiment of the present invention.

FIG. 20 is a diagram showing another example of the sheet feed cassette information table 515 managed by the sheet feed cassette management section 514. In the sheet feed cassette sheet information list shown in FIG. 20, the name of a sheet feed cassette, a sheet size, a sheet name, and a sheet brand ID are recorded. Note that the configuration of the sheet feed cassette sheet information list is not limited to this, but any other items may be added. Further, in the sheet feed cassette sheet information list, the sheet information is added by executing the above-described sheet attribute information acquisition process. For example, it is assumed that a job is started in a state in which the sheet information has been set to the sheet feed cassettes 1 to 3 but the sheet information has not been set to the sheet feed cassette 4 and the manual feeding tray. A case will be described where when the job is resumed under this assumption, the sheet size and the sheet brand of the sheet feed cassette 3 are changed by the user, and further, a sheet is set on the manual feeding tray to resume the job. In this case, the sheet information items of the sheet feed cassettes 1 to 3 are recorded in the sheet feed cassette sheet information list by the sheet attribute information acquisition process executed when the job is started. After that, the sheet information of the manual feeding tray and the sheet information of the sheet feed cassette 3 are added by the sheet attribute information acquisition process executed when the job is resumed. Thus, in a case where the sheet size or the sheet brand information is changed even with respect to the same sheet feed cassette, the changed information is recorded in the sheet feed cassette sheet information list as other information. Note that in a case where the same sheet feed cassette is recorded a plurality of times in the sheet feed cassette sheet information list, the ordinal number of a recording time, and so forth, may be described after the description of the sheet feed cassette so as to enable the user to perform determination with respect to each sheet feed cassette. For example, in FIG. 20, the sheet feed cassette 3 is recorded twice, and hence as the second description of the sheet feed cassette, "sheet feed cassette 3-2" is described.

As described above, in the present embodiment, the sheet feed cassette management section 514 functions as attribute changing means that is capable of appropriately setting (changing) the attribute of at least one of the first attribute and the second attribute. With this, it is possible to add the sheet information with respect to e.g. a tray to which the sheet information has not been set.

In the present embodiment, in a case where the job status notification indicates the resumption of the job, other sheet attribute information different from the sheet attribute information acquired at the start of the print job is acquired. The other sheet attribute information is sheet information changed by the user after the start of the print job. With this, it is possible to transmit the other sheet attribute information changed after the job was started and the print order information using the changed sheet attribute information.

Further, in the present embodiment, in a case where the job status notification indicates the resumption of the job, the sheet attribute information, which was not acquired from a sheet feed cassette at the start of the job but has been set for the sheet feed cassette at the resumption of the print job, is acquired. With this, it is possible to transmit the sheet attribute information which was not set at the start of the print job but has been set at the resumption of the print job.

Further, in the present embodiment, a sheet information-unacquired sheet feed cassette list is generated, which is the list information on one(s) of the plurality of sheet feed cassettes, whose sheet attribute information has not been acquired at the start of the print job. With this, it is possible to reduce the load of processing for identifying a sheet feed cassette to be processed in the step S906, compared e.g. with a case using the sheet feed cassette list which is the list information of the sheet feed cassettes of the printer engine 411.

Next, a description will be given of a fourth embodiment of the present invention with reference to FIG. 15.

Figure 15:
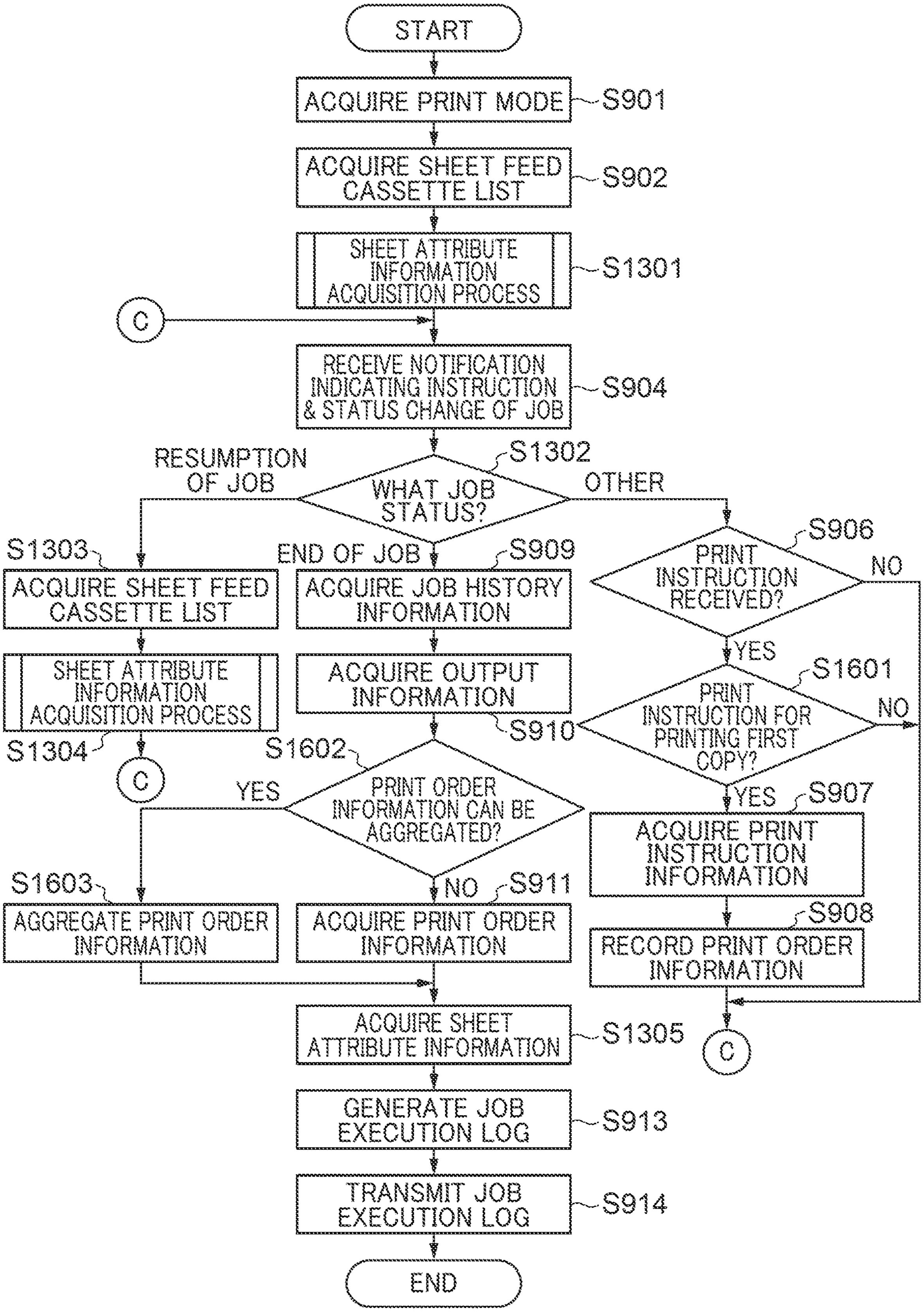
FIG. 15 is a flowchart of a job execution log generation process performed by the image forming apparatus according to a fourth embodiment.

FIG. 15 is a flowchart of a job execution log generation process performed by the image forming apparatus according to the fourth embodiment. Similar to the job execution log generation process in FIG. 13, the job execution log generation process in FIG. 15 is realized by a control program loaded by the CPU 401 from the ROM 403 into the RAM 402. Further, the job execution log generation process in FIG. 15 is also executed when the image forming apparatus 101 receives the above-described print job and an instruction for executing the print job, and so forth from the user, and the transmission data generation section 511 receives a job status notification indicating the start of the job. In the following description, the same processing as that in the job execution log generation process in FIG. 13 is denoted by the same step number, and the description is given of processing different from the job execution log generation process in FIG. 13.

Referring to FIG. 15, first, the steps S901, S902, S1301, and S904 are sequentially executed. Then, the step S1302 for determining the job status is executed. In the step S1302, the transmission data generation section 511 determines which of a notification indicating the end of the job, a notification indicating the resumption of the job, or a notification indicating an event other than these (hereinafter referred to as the "other notification") is indicated by the received job status notification.

If it is determined in the step S1302 that the received job status notification indicates the resumption of the job, the transmission data generation section 511 sequentially executes the steps S1303 and S1304. Then, the job execution log generation process returns to the step S904.

If it is determined in the step S1302 that the received job status notification indicates the other notification, the transmission data generation section 511 performs the determination in the step S906. If it is determined in the step S906 that the received job status notification is not a print instruction, the job execution log generation process returns to the step S904. If it is determined in the step S906 that the received job status notification is a print instruction, the transmission data generation section 511 determines whether or not the received print instruction is an instruction for printing a first copy (step S1601). If it is determined in the step S1601 that the received print instruction is not an instruction for printing a first copy, the job execution log generation process returns to the step S904. If it is determined in the step S1601 that the received print instruction is an instruction for printing a first copy, the steps S907 and S908 are executed. Then, the job execution log generation process returns to the step S904.

If it is determined in the step S1302 that the received job status notification indicates the end of the job, the transmission data generation section 511 sequentially executes the steps S909 and S910. Then, the transmission data generation section 511 acquires the print order information from the job management section 505 and determines whether or not the print order information can be aggregated (step S1602). In this step, the transmission data generation section 511 determines whether or not the print order information can be aggregated by acquiring the print order information from the job management section 505 and determining whether or not the sheet feed cassette and the color mode are the same in all of the print order information items. In a case where the sheet feed cassette and the color mode are the same in all of the print order information items, it is determined that the print order information can be aggregated, whereas if not, it is determined that the print order information cannot be aggregated. If it is determined in the step S1602 that the print order information cannot be aggregated, the step S911 is executed. Then, the job execution log generation process sequentially executes the steps S912, S913, and S914. On the other hand, if it is determined in the step S1602 that the print order information can be aggregated, the transmission data generation section 511 acquires the print order information from the job management section 505 and aggregates the print order information (step S1603). In the transmission data generation section 511, aggregation is performed using the same determination criterion as that for the determination of aggregation in the step S1601. For example, in a case where the sheet feed cassette and the color mode are the same in all of the print order information items, it is possible to aggregate the information only in the first information included in the print order information. The transmission data generation section 511 temporarily stores the aggregated print order information in the RAM 402. In this aggregated print order information, only the information aggregated by reducing the redundant print information in the job is included, and the transmission data generation section 511 reads this aggregated print order information and temporarily stores the read information in the RAM 402. Then, the job execution log generation process sequentially executes the steps S1305, S913, and S914.

In the present embodiment, when recording the print order information for each print instruction, in a case where a plurality of copies of the print job are printed, the print order information is recorded only when executing the first job. For example, in a case where a job for 10 pages is executed five times, i.e. five copies are printed, the print order information of 10 pages of the first job is recorded. This makes it possible to reduce the information to be recorded as the job execution log.

In the present embodiment, the print order information is acquired based on a print instruction, and in a case where a job execution log is output, whether or not the print order information is the same in all pages is determined, and a job execution log is generated by determining whether to output the print order information items of all pages or only the print order information of the first page because the print order information is the same in all pages. With this, it is possible to cause a job execution log to include information necessary for analyzing the print control and reduce information to be recorded in the job execution log.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-138951 filed Aug. 27, 2021, which is hereby incorporated by reference herein in its entirety.

What is claimed is:

1. An image forming apparatus that includes an image forming section configured to form an image on a sheet and is capable of communicating with a server, the image forming apparatus comprising:

at least one processor; and a memory coupled to the at least one processor, the memory having instructions that, when executed by the at least one processor, perform operations as:

an execution unit configured to cause the image forming section to execute an image formation job including a first step that forms an image on a first sheet having a first attribute and a second step that forms an image on a second sheet having a second attribute different from the first attribute after the first step;

an acquisition unit configured to acquire history information of the image formation job, the history information indicating at least a number of times that switching between the first step and the second step occurred in the image formation job;

a notification unit configured to notify the server of the history information indicating the number of times that the switching between the first step and the second step occurred in the image formation job and to (ii) receive, from the server, a lifetime of a component of the image forming apparatus determined based on both (ii.a) a number of times that the component of the image forming apparatus has been used and (ii.b) the history information, notified from the notification unit, indicating the number of times that the switching between the first step and the second step occurred in the image formation job; and a display unit configured to display information indicating the lifetime of the component of the image forming apparatus determined based on both (ii.a) the number of times that the component of the image forming apparatus has been used and (ii.b) the history information, notified from the notification unit, indicating the number of times that the switching between the first step and the second step occurred in the image formation job.

2. The image forming apparatus according to claim 1, wherein a difference between the first attribute and the second attribute is a difference in a thickness of the first sheet and a thickness of the second sheet, wherein the execution unit forms images on the first and second sheets which are different in thickness between the first step and the second step, as the image formation job, and wherein the acquisition unit acquires the history information of the image formation job after the image formation job has been executed by the execution unit.

3. The image forming apparatus according to claim 1, wherein a difference between the first attribute and the second attribute is a difference in a size of the first sheet and a size of the second sheet, wherein the execution unit forms images on the first and second sheets which are different in size between the first step and the second step, as the image formation job, and wherein the acquisition unit acquires the history information of the image formation job after the image formation job has been executed by the execution unit.

4. The image forming apparatus according to claim 1, wherein a difference between the first attribute and the second attribute is whether a front side or a reverse side of the first sheet is printed and whether a front side or a reverse side of the second sheet is printed, wherein the execution unit forms an image on the front side of one of the first and second sheets in one step of the first step and the second step, and forms an image on the reverse side of the other of the first and second sheets in the other step, as the image formation job, and wherein the acquisition unit acquires the history information of the image formation job after the image formation job has been executed by the execution unit.

5. The image forming apparatus according to claim 1, further comprising a detection unit configured to detect an environmental condition including at least a temperature and a humidity around the image forming section when the image formation job is executed, and wherein the acquisition unit acquires information on the environmental condition as part of the history information.

6. The image forming apparatus according to claim 1, wherein in a case where the image formation job is temporarily interrupted between the first step and the second step, the acquisition unit acquires information on the interruption as part of the history information.

7. The image forming apparatus according to claim 1, wherein in a case where the component of the image forming apparatus is replaced, the notification unit notifies the server of information on the replacement.

8. The image forming apparatus according to claim 1, wherein the memory further has instructions that, when executed by the at least one processor, further perform operations as an attribute changing unit configured to change at least one of the first attribute and the second attribute.

9. The image forming apparatus according to claim 1, wherein the memory further has instructions that, when executed by the at least one processor, further perform operations as a condition changing unit configured to change a condition for forming an image in the first step and the second step.

10. An information processing system that includes an image forming apparatus including an image forming section configured to form an image on a sheet, and a server that is capable of communicating with the image forming apparatus and collecting log information of the image forming apparatus, the image forming apparatus comprising:

at least one processor; and a memory coupled to the at least one processor, the memory having instructions that, when executed by the at least one processor, perform operations as:

an execution unit configured to cause the image forming section to execute an image formation job including a first step that forms an image on a first sheet having a first attribute and a second step that forms an image on a second sheet having a second attribute different from the first attribute after the first step;

an acquisition unit configured to acquire history information of the image formation job, the history information indicating at least a number of times that switching between the first step and the second step occurred in the image formation job;

a notification unit configured to notify the server of the history information indicating the number of times that the switching between the first step and the second step occurred in the image formation job and to (ii) receive, from the server, a lifetime of a component of the image forming apparatus determined based on both (ii.a) a number of times that the component of the image forming apparatus has been used and (ii.b) the history information, notified from the notification unit, indicating the number of times that the switching between the first step and the second step occurred in the image formation job; and a display unit configured to display information indicating the lifetime of the component of the image forming apparatus determined based on both (ii.a) the number of times that the component of the image forming apparatus has been used and (ii.b) the history information, notified from the notification unit, indicating the number of times that the switching between the first step and the second step occurred in the image formation job, and the server comprising:

at least one processor; and a memory coupled to the at least one processor, the memory having instructions that, when executed by the at least one processor, perform operations as:

a server acquisition unit configured to acquire the history information notified from the notification unit; and an identification unit configured to identify, based on the history information acquired by the server acquisition unit, the lifetime of the component of the image forming apparatus determined based on both (ii.a) the number of times that the component of the image forming apparatus has been used and (ii.b) the history information indicating the number of times that the switching between the first step and the second step occurred in the image formation job.

11. A method of controlling an image forming apparatus that includes an image forming section configured to form an image on a sheet and is capable of communicating with a server, the method comprising:

causing the image forming section to execute an image formation job including a first step that forms an image on a first sheet having a first attribute and a second step that forms an image on a second sheet having a second attribute different from the first attribute after the first step;

acquiring history information of the image formation job, the history information indicating at least a number of times that switching between the first step and the second step occurred in the image formation job;

notifying the server of the history information indicating the number of times that the switching between the first step and the second step occurred in the image formation job;

receiving, from the server, a lifetime of a component of the image forming apparatus determined based on both (i) a number of times that the component of the image forming apparatus has been used and (ii) the history information indicating the number of times that the switching between the first step and the second step occurred in the image formation job; and displaying information indicating the lifetime of the component of the image forming apparatus determined based on both (i) the number of times that the component of the image forming apparatus has been used and (ii) the history information indicating the number of times that the switching between the first step and the second step occurred in the image formation job.

12. A non-transitory computer-readable storage medium storing a program for causing a computer to execute a method of controlling an image forming apparatus that includes an image forming section configured to form an image on a sheet and is capable of communicating with a server, wherein the method comprises:

causing the image forming section to execute an image formation job including a first step that forms an image on a first sheet having a first attribute and a second step that forms an image on a second sheet having a second attribute different from the first attribute after the first step;

acquiring history information of the image formation job, the history information indicating at least a number of times that switching between the first step and the second step occurred in the image formation job;

notifying the server of the history information indicating the number of times that the switching between the first step and the second step occurred in the image formation job;

receiving, from the server, a lifetime of a component of the image forming apparatus determined based on both (i) a number of times that the component of the image forming apparatus has been used and (ii) the history information indicating the number of times that the switching between the first step and the second step occurred in the image formation job; and displaying information indicating the lifetime of the component of the image forming apparatus determined based on both (i) the number of times that the component of the image forming apparatus has been used and (ii) the history information indicating the number of times that the switching between the first step and the second step occurred in the image formation job.

* * * * *